(12) United States Patent
Hough et al.

(10) Patent No.: US 11,861,911 B2
(45) Date of Patent: *Jan. 2, 2024

(54) VIDEO ANALYTICS PLATFORM FOR REAL-TIME MONITORING AND ASSESSMENT OF AIRPLANE SAFETY PROCESSES

(71) Applicant: GAT Airline Ground Support, Inc., Peachtree City, GA (US)

(72) Inventors: Michael Hough, Prospect, KY (US); Harold Eiermann, Magnolia, TX (US); Tracey Metzger, Atlanta, GA (US)

(73) Assignee: GAT Airline Ground Support, Inc., Peachtree City, GA (US)

(*) Notice: Subject to any disclaimer, the term of this patent is extended or adjusted under 35 U.S.C. 154(b) by 119 days.

This patent is subject to a terminal disclaimer.

(21) Appl. No.: 17/503,769

(22) Filed: Oct. 18, 2021

(65) Prior Publication Data

US 2022/0172592 A1 Jun. 2, 2022

Related U.S. Application Data

(63) Continuation of application No. 17/318,043, filed on May 12, 2021, now Pat. No. 11,151,855.
(Continued)

(51) Int. Cl.
*G08B 23/00* (2006.01)
*G06V 20/52* (2022.01)
(Continued)

(52) U.S. Cl.
CPC ............ *G06V 20/52* (2022.01); *G06F 18/214* (2023.01); *G06V 20/40* (2022.01); *G08B 21/02* (2013.01)

(58) Field of Classification Search
CPC ...... G06V 20/52; G06V 20/40; G06F 18/214; G08B 21/02
(Continued)

(56) References Cited

U.S. PATENT DOCUMENTS 6,542,086 B2   4/2003   Baumgartner
7,511,612 B1   3/2009   Monroe
(Continued)

OTHER PUBLICATIONS

Weagle, Stephanie, "Overcome the Challenges of Airport Surveillance Security: Data-Driven Analytics Software Creates a Powerful Tool in Protecting Airports", AviationPros, online at <URL: https://www.aviationpros.com/aviation-security/video-surveillance/article/12440360/overcoming-the-challenges-of-airport-surveillance-security>, Apr. 15, 2019, 17 pages.

*Primary Examiner* — Tai T Nguyen
(74) *Attorney, Agent, or Firm* — Sheppard Mullin Richter & Hampton LLP

(57) ABSTRACT

A video analytics system for real-time monitoring and assessment of airplane ramp safety processes comprises rules relating to airplane ramp safety processes, portable video capture devices located at different predetermined positions with respect to an airplane at an airport ramp which capture video and data related to movements and positioning of objects and services being provided relative to the aircraft at the airport ramp and transmit captured video footage and data via a wireless network to a server which performs video analytics on the captured video and data to generate video analytics data, compare the video analytics data to the rules relating to the airplane safety processes, to determine any safety conditions, store the results of the comparison and output a real-time notification if a safety condition is determined.

20 Claims, 25 Drawing Sheets

Related U.S. Application Data

(60) Provisional application No. 63/119,327, filed on Nov. 30, 2020.

(51) Int. Cl.
  *G08B 21/02* (2006.01)
  *G06V 20/40* (2022.01)
  *G06F 18/214* (2023.01)

(58) Field of Classification Search
  USPC .......................................................... 340/963
  See application file for complete search history.

(56) References Cited

U.S. PATENT DOCUMENTS

| | | | |
|---|---|---|---|
| 11,538,349 B2* | 12/2022 | Poojary | G01S 13/867 |
| 2003/0067542 A1* | 4/2003 | Monroe | H04N 7/181 |
| | | | 348/E7.086 |
| 2006/0048845 A1 | 3/2006 | Slavin | |
| 2007/0035632 A1 | 2/2007 | Silvernail | |
| 2017/0178520 A1* | 6/2017 | Papageorgiou | G08G 5/065 |
| 2020/0180783 A1* | 6/2020 | Cox | G05D 1/0027 |

* cited by examiner

Executive dashboard

Search filters

Select date: 2019-04-09 – 2019-04-16

Select airport(s): 1 airport(s) selected

Compliance averages

| Stages | High | Average compliance | Low |
|---|---|---|---|
| Arrival | 100 | 100 | 100 |
| Post-arrival | 100 | 96.55 | 83.33 |
| Post-departure | 100 | 43.48 | 0 |
| Pre-arrival | 83.33 | 67.65 | 60 |
| Pre-departure preparations | 87.6 | 78.95 | 66.37 |
| Upload | 100 | 70.37 | 0 |

Welcome
Home
Executive dashboard
Monitoring reports
Monitoring details
Change password
Contact us

Search filters

Select dates:
2019-04-09 - 2019-04-16

Select airport(s):
1 airport(s) selected ▾

Select gate(s):
4 gate(s) selected ▾  [Search]

FIG. 8

| Compliance averages | | | |
|---|---|---|---|
| Stages | High | Average compliance | Low |
| Arrival | 100 | 100 | 100 |
| Post-arrival | 100 | 96.55 | 83.33 |
| Post-departure | 100 | 43.48 | 0 |
| Pre-arrival | 83.33 | 67.65 | 60 |
| Pre-departure preparations | 87.5 | 78.95 | 66.67 |
| Upload | 100 | 70.37 | 0 |

FIG. 9

Total error: 73

| Task | Count |
|---|---|
| Beltloader forward chock remained in place until unit is backed up clear aircraft | 1 |
| Beltloader rear cone used after beltloader in place and before tug approaches cone may be removed once tug in place (set of the side) | 2 |
| Cones are removed only after all GSE are clear of aircraft and chocked | 1 |
| FOD walk completed | 11 |
| FOD walk conducted back into the gate | 3 |
| Motorized GSE positioned in accordance with carrier requirements (i.e. 5 rule, safety diamond, etc.) | 8 |
| Post departure huddle conducted at "Huddle cone" | 10 |
| Pre-departure FOD walk completed | 13 |
| Pre-departure walk around completed? | 7 |
| Was a pre-departure safety huddle conducted at "Huddle cone" | 6 |

FIG. 12

Search filters

Select dates:
2019-04-09 - 2019-04-16

Select airport(s):
1 airport(s) selected

Select gate(s):
4 gate(s) selected

Search

FIG. 13

Monitoring details

Search filters

Select dates:
2019-04-09 - 2019-04-16

Select airports(s):
1 airport(s) selected

Select gate(s):
4 gate(s) selected

Select turn(s):
20 turn(s) selected

Select category(s):
7 category(s) selected

Select answer(s):
4 answer(s) selected

Search

FIG. 14

| Task | Yes | No | Camera | Obstructed | Picture |
|---|---|---|---|---|---|
| Wearing safety vests and zipped up | ✓ | x | x | x | |
| Was pre-arrival safety huddle conducted at "Huddle cone" | x | ✓ | x | x | |
| Safety zone clear | ✓ | x | x | x | |
| FOD walk completed | x | ✓ | x | x | |
| Proper wands available and working (as required) | ✓ | x | x | x | ○ |
| Steering by-pass pin visually verified as part of the safety huddle | x | x | ✓ | x | |
| Marshall and wing walkers in position | ✓ | x | x | x | |
| Correct hand signals being used | ✓ | x | x | x | |
| Nose gear chocks applied immediately | ✓ | x | x | x | |
| Steering by-pass pin installed by agent inserting nose gear chocks or steering otherwise bypassed (switch) | ✓ | x | x | x | |

FIG. 15 (Cont.)

| Compliance AVG. by category | | | | |
|---|---|---|---|---|
| Task | Stage | Total turns observed | Error count | Failures % |
| Wearing safety vests and zipped up | Pre-arrival | 64 | 1 | 1.56% |
| 3 stop brake check completed (as required) | Post-arrival | 39 | 0 | 0.00% |
| Pushback does not start until wing walkers | Pre-departure FY... | 36 | 0 | 0.00% |
| Pushback operator verifies steering bypass | Pre-departure FY... | 45 | 13 | 29.89% |
| Pushback does not start until wing walkers | Departure / tow O... | 16 | 0 | 0.00% |
| Beltloader near cone used after beltloader in | Post-arrival | 54 | 4 | 7.41% |
| 3 stop brake check completed (as required) | Post-arrival | 51 | 0 | 0.00% |
| --- | Departure / tow O... | 17 | 1 | 5.55% |
| --- | Departure / tow O... | 55 | 1 | 6.25% |

FIG. 15A

| Observations % | Overall total turns | overall observed turns | Overall failures % | Overall observations % | Variance % |
|---|---|---|---|---|---|
| 52.03% | 9693 | 5405 | 16.49% | 56.69% | -14.93% |
| 31.33% | 9693 | 3778 | 3.65% | 38.08% | -3.65% |
| 29.27% | 9692 | 3587 | 4.74% | 37.01% | -4.74% |
| 36.59% | 9692 | 2799 | 29.12% | 28.88% | -0.23% |
| 53.01% | 9692 | 2042 | 0.15% | 21.07% | -0.15% |
| 43.90% | 9692 | 4158 | 16.47% | 42.90% | -0.06% |
| 41.48% | 9693 | 4497 | 7.83% | 46.39% | -7.83% |
| 13.82% | 9692 | 2406 | 1.25% | 24.82% | 4.63% |
| 13.01% | 9692 | 1876 | 1.33% | 19.36% | 4.92% |

FIG. 15A (Cont.)

VIDEO ANALYTICS PLATFORM FOR REAL-TIME MONITORING AND ASSESSMENT OF AIRPLANE SAFETY PROCESSES

CROSS-REFERENCE TO RELATED APPLICATION

This application is a continuation of U.S. patent application Ser. No. 17/318,043, filed May 12, 2021, entitled "VIDEO ANALYTICS PLATFORM FOR REAL-TIME MONITORING AND ASSESSMENT OF AIRPLANE SAFETY PROCESSES", issued as U.S. Pat. No. 11,151,855 on Oct. 19, 2021, which claims the benefit under 35 U.S.C. § 119(e) of U.S. Provisional Application Ser. No. 63/119,327, filed Nov. 30, 2020, entitled "VIDEO ANALYTICS PLATFORM FOR REAL-TIME MONITORING AND ASSESSMENT OF AIRPLANE SAFETY PROCESSES", which are hereby incorporated by reference in their entirety.

TECHNICAL FIELD

The disclosed technology relates to a video analytics platform for real-time monitoring and assessment of airplane safety processes.

BACKGROUND

Fixed video surveillance technology installed throughout airport operations for the purposes of securing restricted areas is known. The video may be used to provide notifications when a person breaches a secure area. For example, a video camera may be directed at a door (e.g., an airport gate, security check, etc.) and a security administrator may watch the live stream of video from a secure location. When a person enters or exits through the door, the security administrator may identify the activity by watching the live stream of video. Typically, the video camera may be mounted at a fixed located (e.g., directed at the door and/or airport gate).

Known video systems have a number of limitations and are typically for security purposes, but they are not typically used for monitoring safety procedures.

For example, a video security camera may be concerned with a person that is adjacent to an airplane. A security system may be more concerned with whether an authorized person in proximity to an airplane is wearing a colored safety vest.

For these and other reasons, existing airport video security systems are not used and/or effective for real-time monitoring and assessment of airplane safety processes.

Airports and airlines have manual procedures to track safety processes. However, these are typically manual processes, and the relevant information is not collected and/or processed in real-time to prevent safety issues in real-time.

Other limitations and drawbacks exist with known systems.

BRIEF SUMMARY OF EMBODIMENTS

Various methods, systems, and computer-readable media are disclosed herein. In some embodiments, the invention relates to a system and method for monitoring airport ramp safety processes and procedures by capturing video of the ramp area, analyzing the captured video, and comparing the content to stored documented safety processes and procedures to improve safety. The analysis may also help mitigate events that could lead to injury or damage to equipment by providing notifications in real-time or offline.

The system may include a customized, weather resistant, portable video capture device for capturing data for real-time or off-line observations. Two or more video capture devices may be selectively positioned relative to the location of the aircraft based on the type of aircraft being monitored and other factors (e.g., the services being provided to an aircraft). These selectively positioned video capture devices would be placed in a manner to provide a range of visibility to cover the entire safety diamond area of a parked aircraft. In some examples, the video capture devices may be stationary or moveable for capturing data.

The video capture device may collect video footage and data related to movements and positioning of objects and services being provided relative to an aircraft. The video capture device may include a Wi-Fi or cellular network interface for the uploading of data in real-time and or in batch mode.

The video and data may be wirelessly transmitted or otherwise conveyed from the video capture device to a server. The server may include a real-time transaction engine (RTE). The RTE may perform analytics on the video, store information obtained from the video, compare the video analytics data to stored rules and content relating to stored, safety processes and procedures. The results of the comparison can be stored. If certain conditions are detected, the RTE may output real-time notifications and/or provide alerts in real-time to address safety concerns.

The system may include a server that communicates with the portable video capture devices. The system may store and process data and video. The system may include a user interface that provides users with analytical data and historical video used to improve the operation and safety practice.

The system may include an artificial intelligence/machine learning engine to process the captured data.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 7 illustrates a graphical user interface providing a monitoring details dashboard, in accordance with some embodiment discussed herein.

FIG. 8 illustrates a graphical user interface for providing a search function within an executive dashboard, in accordance with some embodiment discussed herein.

FIG. 9 illustrates a graphical user interface for providing compliance averages, in accordance with some embodiment discussed herein.

FIG. 12 illustrates a graphical user interface for providing a total error panel, in accordance with some embodiment discussed herein.

FIG. 13 illustrates a graphical user interface for providing a search filters panel, in accordance with some embodiment discussed herein.

FIG. 14 illustrates a graphical user interface for providing a monitoring details panel, in accordance with some embodiment discussed herein.

FIG. 15A illustrates a graphical user interface for providing an observation improvement report, in accordance with some embodiment discussed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Various components of a video analytics platform are described herein. The video analytics platform may be configured to provide real-time monitoring and assessment of airplane safety processes.

Video Analytics Platform

Figure 1:
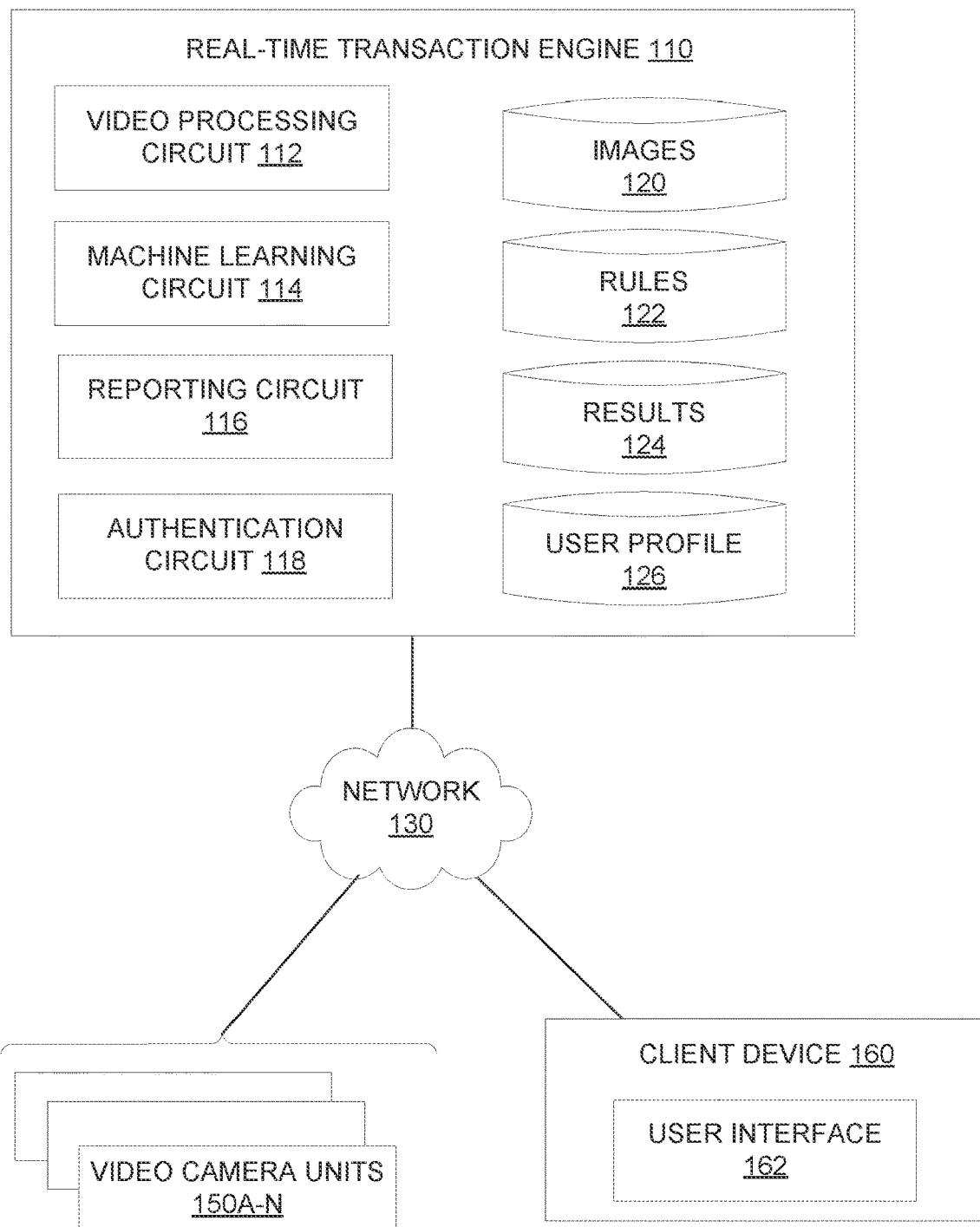
FIG. 1 illustrates a real-time transaction engine, video camera unit, and client device, in accordance with some embodiment discussed herein.

FIG. 1 may comprise real-time transaction engine 110 that communicates via network 132 to both video camera unit 150 and client device 160. Each of real-time transaction engine 110, video camera unit 150, and client device 160 may comprise processors, memory, antennas, and other components of computing devices to enable these computing devices to communicate via network 130 and execute machine-readable instructions.

Real-Time Transaction Engine

Real-time transaction engine 110 comprises video processing circuit 112, machine learning circuit 114, and reporting circuit 116. Additional circuits and components may be included without diverting from the scope of the disclosure.

Real-time transaction engine 110 is configured to receive video, audio, and other media from video camera unit 150 via network 130. The media data may comprise footage captured from around an airport facility regarding ramp operations, safety checks, or other information used to validate compliance with safety rules, policies, and procedures. The video data may be wirelessly transmitted or otherwise conveyed from video camera unit 150 to real-time transaction engine 110.

Real-time transaction engine 110 is configured to provide video streaming (e.g., WebRTC) and related capabilities. The capabilities may include transcoding inbound and outbound videos from/into various video and audio codecs and formats, recording and storing videos or individual frames on the server, transcoding and compressing videos, ingesting and processing multiple video streams concurrently, applying ML and non-ML filters to video streams and individual frames, providing SFU (Selective Forwarding Unit) and MCU (Multipoint Conferencing Unit) functionalities enabling videoconferencing and video streams mixing, providing TURN and STUN servers functionalities allowing better routing of WebRTC connections and NAT traversal, supporting combined media pipelines allowing insertion of Computer Vision, statistical and other filters and modules into media processing pipeline, cross-platform WebRTC video streaming to iOS, Android, React Native, Web and desktop applications, the capability of applying augmented reality visualizations, masks and effects in 2D and 3D to real-time video streams, the capabilities of mixing and blending video streams as well as video calling, group communication and broadcasting.

Video processing circuit 112 is configured to perform analytics on the video. For example, the analytics may identify metadata of the video, including location, originating video camera unit 150, date or time stamp, and other information. The information may be stored with images data store 120.

Video processing circuit 112 is configured to recognize one or more objects in the video. For example, video processing circuit 112 may compare known images stored with images 120 with received images from video camera unit 150. Video processing circuit 112 may tag the one or more objects with an object identifier based on the comparison between the known images and the identified image in the received video. The object identifier, timestamp, video portion, metadata, or other information (e.g., generated by optical character recognition (OCR), etc.) may be stored in images data store 120.

Video processing circuit 112 is configured to augment or add to the media data. For example, video processing circuit 112 is configured to provide video, image, and web interface augmentation capabilities in relation to Artificial Intelligence, Computer Vision detection, and related user interfaces such as preconfigured and pre-developed capabilities to visually highlight detected objects and scenes, to highlight movements of most importance, to overlay characteristics of detected objects and events.

Video processing circuit 112 may compare the object identifier, timestamp, video portion, metadata, or other information from images data store 120 with rules from rules data store 122. Rules data store 122 may comprise various content relating to safety processes and procedures.

Video processing circuit 112 may compare the object identifier generated from the video analytics to stored rules from rules data store 122. As an illustrative example, when a vest is required at a particular location, video processing circuit 112 may determine that the object identifier from the tagged media identifies a vest in the video. Video processing circuit 112 may confirm that the stored rule is satisfied based on the object identifier found in the media. The results of the comparison may be stored in results data store 124. Additional information and illustrative rules stored with rules data store 122 are provided herein with the subsection labeled "illustrative examples in rules data store."

Machine learning circuit 114 is configured to receive media input, provide the media input to one or more trained machine learning (ML) models, and generate output in view of an objective function corresponding with each trained ML model. Additional information regarding the machine learning process is provided with FIG. 4.

Reporting circuit 116 is configured to generate one or more reports, alerts, notifications, or other information based on the comparisons or determinations described herein. The reports and alerts may be generated in real-time to correspond with the real-time streaming video from video camera unit 150. If certain conditions are detected, reporting circuit 116 may output real-time notifications and/or provide alerts in real-time to address safety concerns.

Reporting circuit 116 is configured to transmit generated reports on a predetermined basis (e.g., daily, etc.) to designated client devices 160. In some examples, the reports may be transmitted in accordance with an event (e.g., Daily Safety Briefings, Monthly Station Safety Meetings, one-on-one briefings, Safety Huddles, etc.).

Reporting circuit 116 is configured to provide other data to a user interface. For example, reporting circuit 116 may provide a smart timeline, dashboard, and/or video player. The other capabilities may include viewing the video stream in real-time in a web application, mobile application, or desktop application video player interface allowing to stream one or more videos simultaneously; playing, stopping, pausing, rewinding, fast-forwarding the videos; switching between camera views and/or open pre-recorded videos; capability to highlight important detections with color coding and other interface elements in the video player timeline; capability to skip/fast-forward intervals of no importance as determined by the system or user settings; capability to search through stored videos and highlight in search results and in the video player timeline the occurrences of the detection or event user is searching for; capability to display and store the internal console showing lower level detections, logging and other system information as part of user interface; dashboard capability allowing to display multiple video streams at the time, overlay, and augment videos, zoom in and zoom out videos, including capabilities of automated triage and detection of most important detections or events among displayed and non-displayed video streams and ability to automatically zoom in and alert human operator of the displayed or non-displayed video where highest ranking detections or events are happening.

Reporting circuit 116 is configured to provide smart feedback. The capabilities may include providing an overlay of the user interface to provide end users with an easy way to communicate false positive and false negative detections to the system; automated ML and non-ML based methods to infer false positive and false negative detections from user interactions or inactivity; automated re-training and re-learning loop system automatically applying false negative and false positive detections to re-learning or transfer learning of ML models.

Reporting circuit 116 is configured to transmit electronic messages via network 130. The messaging system may be based on various communication protocols (e.g., Extensible Messaging and Presence Protocol (XMPP) instant messaging protocol, Ejabberd® server, accompanying custom-made services and APIs, etc.). The messaging may allow end users and automated systems (such as chat bots, ML and non-ML detects, alerting system, etc.) to carry out text-based communication between each other via existing interfaces of the system and/or integrated into 3rd party mobile, web, and desktop applications.

Reporting circuit 116 is configured to transmit alerts or statistics. The capabilities may include push notifications, e-mail, user interface audio and visual alerts providing the designated contacts with real-time and summary alerts regarding detections, conclusions, and other information from the system.

Reporting circuit 116 is configured to generate a compliance score. The compliance score corresponds with a number of rules that are satisfied based on a comparison between the media data and one or more rules from rules data store 122. The compliance score may be of value (e.g., 100) and each image that identifies that a rule is not satisfied may reduce the compliance score. In some examples, the goal may be to achieve 100% compliance or satisfaction of each of the rules for the location from rules data store 122.

The compliance score may be compared with a score threshold. Corrective action may be identified based on the comparison of the score to the score threshold. In some examples, different score thresholds may correspond with different actions.

Reporting circuit 116 is configured to generate one or more reports based on different stages, timestamps, locations, and the like. An illustrative example is shown herein.

| Stages | Goal | Average Compliance | Action Plan Required |
| --- | --- | --- | --- |
| Arrival | 100 | 100 | N |
| Post-Arrival | 100 | 93.1 | N |
| Post-Departure | 100 | 56.52 | Y |
| Pre-Arrival | 100 | 74.03 | Y |
| Pre-Departure Preparations | 100 | 79.82 | Y |
| Upload | 100 | 57.14 | Y |

Reporting circuit 116 is configured to generate a corrective action plan. When developing the corrective action plan, the following template may be used to drive consistency and to ensure the plan meets various rules stored in rules data store 122. The action plan may be designed to address each individual element that has been identified (e.g., media data, rule, etc.), describe what will be implemented or put into place to improve compliance level(s), establish a timeline for when the plan objectives are expected to be achieved, indicate the person(s) responsible for implementation, and follow up and verification of objective effectiveness.

Reporting circuit 116 is configured to generate and update a dashboard to display information in real-time. Historical media may also be accessible and provided via the dashboard. The dashboard may be accessible by client device 160 and provided for display at user interface 162. Illustrative examples of reports and reporting data are provided with FIGS. 5-15.

Authentication circuit 118 is configured to authenticate client device 160 and/or user with access to real-time transaction engine 110. Various reports and/or data may be limited based on a user type associated with the user accessing the system. A username, user type, or other information may be stored with a user profile in user profile data store 126.

In some examples, real-time transaction engine 110 may be configured to monitor and analyze the system itself. Monitoring and analytics may correspond with API, server, and infrastructure parameters allowing to monitor and visualize overall system performance such as uptime and latency of APIs, throughput of media processing and machine learning pipelines, activity, and availability of sources (e.g., video camera unit 150, other video, audio, and data streams, etc.), load diagrams for CPU and GPU servers, data storages, queues etc., including uptime widget, detailed monitoring dashboard, master dashboard and alerts via e-mail, SMS, phone calls, chat messages and push notifications; underlying architecture, storage systems and server-side logic (e.g., MongoDB®, Apache® Cassandra®, MySQL®, Redis®, IPFS®, HDFS®, Apache® Kafka® and Zookeeper®, Kurento®, Janus®, Ejabberd®, Apache® Spark®, Apache® Flink®, Zabbix®, Grafana®, Prometheus®), APIs, backend (server-side) code, and documentation. This includes logic allowing to create and manipulate user accounts, etc.

Client device 160 may access one or more reports generated by reporting circuit 116 and/or reporting data from results data store 124 via network 130. The reporting data may be displayed for presentation at the reporting dashboard by user interface 162. In some examples, client device 160 may receive push notifications from reporting circuit 116 via network 130.

Custom-Designed Video Camera Units

Video camera unit 150 may comprise an off-the-shelf or custom designed video camera assembly. The video camera assembly may include a video capture (e.g. a video camera) encased in a ruggedized housing. The assembly may further include a transmitter (e.g., a wireless, cellular or other transmitter) to receive the video and transmit it in real-time to one or more designated locations (e.g., a server associated with an airport, a central server remote from the airport and/or other locations). The assembly may also include a storage device to store the video captured by the video camera.

In some examples, video camera unit 150 may comply with rules according to Ingress Protection (IP) numbers. For example, video camera unit 150 may comply with IP67 (e.g., totally protected against dust and protected against the effects of temporary immersion between 15 cm and 1 m, or duration of test 30 minutes) and IP68 (e.g., totally protected against dust and protected against long periods of immersion under pressure). Video camera unit 150 may be environmentally tested.

Video camera unit 150 may be encased in a durable, rugged utility case for stability and protection from environmental factors. The case may be equipped with a handle and wheels used to manually roll the unit to one or more locations around the aircraft facility.

Video camera unit 150 may comprise one or more arrows on the case to facilitate proper orientation and alignment. For example, the case may be directed at an angle and location such that the arrow may be pointed toward the aircraft. The position of the arrow may align video camera unit 150 so that the camera lens may capture media corresponding with the aircraft from the particular location and perspective.

Video camera unit 150 may generate a real-time video stream. For example, the camera incorporated with video camera unit 150 may capture images, audio, or other media and store the data locally with video camera unit 150 or transmit it to real-time transaction engine 110 via network 130. Video cam unit 150 may comprise an antenna (e.g., for wireless communications) and/or physical port (e.g., for wired communications).

Video camera unit 150 may comprise a Wi-Fi or cellular network interface for communicating with network 130 and/or uploading the data.

Video camera unit 150 may comprise a camera lens. For example, the camera lens may comprise a wide angle lens for capturing images adjacent to camera unit 150.

Video camera unit 150 may be static or stationary. In some examples, video camera unit 150 may be uniquely placed based on aircraft type and/or other factors. This may comprise internal placements of a particular aircraft, including a first video camera unit 150 on a first floor of an aircraft and a second video camera unit 150 on a second floor of an aircraft when the aircraft corresponds with more than one floor.

Video camera unit 150 may be placed externally to an aircraft. Video camera unit 150 may be positioned each morning or prior to the first operation at designated gates. The units may be placed outside the operational safety zone (OSZ) and are left in position until end of day and/or end of operations at a designated gate. The units may then be retrieved and returned to the docking station for recharge and video data upload. Two cameras are deployed at each designated gate; one at the wingtip, and one at the nose of the aircraft, well behind and/or to the driver's side of the pushback unit.

Deployment And Placement Guidance

Video camera unit 150 may be movable and manually rolled to a designated location. The location to place the one or more video camera units 150 may be determined based on the type of aircraft being monitored and other factors, including the services being provided to the aircraft (e.g., filling gasoline to the aircraft, adding food, safety checks, etc.).

In some examples, video camera unit 150 may be manually moved to align with a marking on the ground, which may be placed at a different location for each airport and gate. The markings may help align the aircraft to the gate in order to properly service the aircraft while the aircraft is stationary at the gate. In an illustrative example, a Boeing 737 may align with Marking 10 and Marking 12, while a Cessna 172 may align with Marking 30 and 31. Video camera unit 150 may be manually rolled to a location corresponding with each marking that is utilized by the aircraft (e.g., 10 feet from Marking 10 and Marking 12, 5 feet above Marking 30, etc.) in order to capture and transmit the video, audio, and other media. In another example, video camera unit 150 may be manually moved to align with a wingtip of the aircraft and a nose of the aircraft in accordance with rules from rules data store 122, unrelated to the markings.

In some examples, video camera unit 150 may be stationary and affixed to correspond with the markings used by the aircraft. For example, when forty markings are incorporated with a gate at an airport, forty cameras may be aligned with the markings. The markings that the aircraft uses to align with the gate may also activate the camera corresponding with the marking. As described with the example above, the two video camera units 150 associated with Marking 10 and Marking 12 may be activated when a Boeing 737 arrives at the gate, which also aligns with Marking 10 and Marking 12. In another example, the two video camera units 150 associated with Marking 30 and 31 may be activated when a Cessna 172 arrives at the gate, which also aligns with Marking 30 and 31. In other examples, each video camera unit 150 may be continually active and stationary to capture video of the aircraft, without the activation process and without diverting from the essence of the disclosure.

Figure 2:
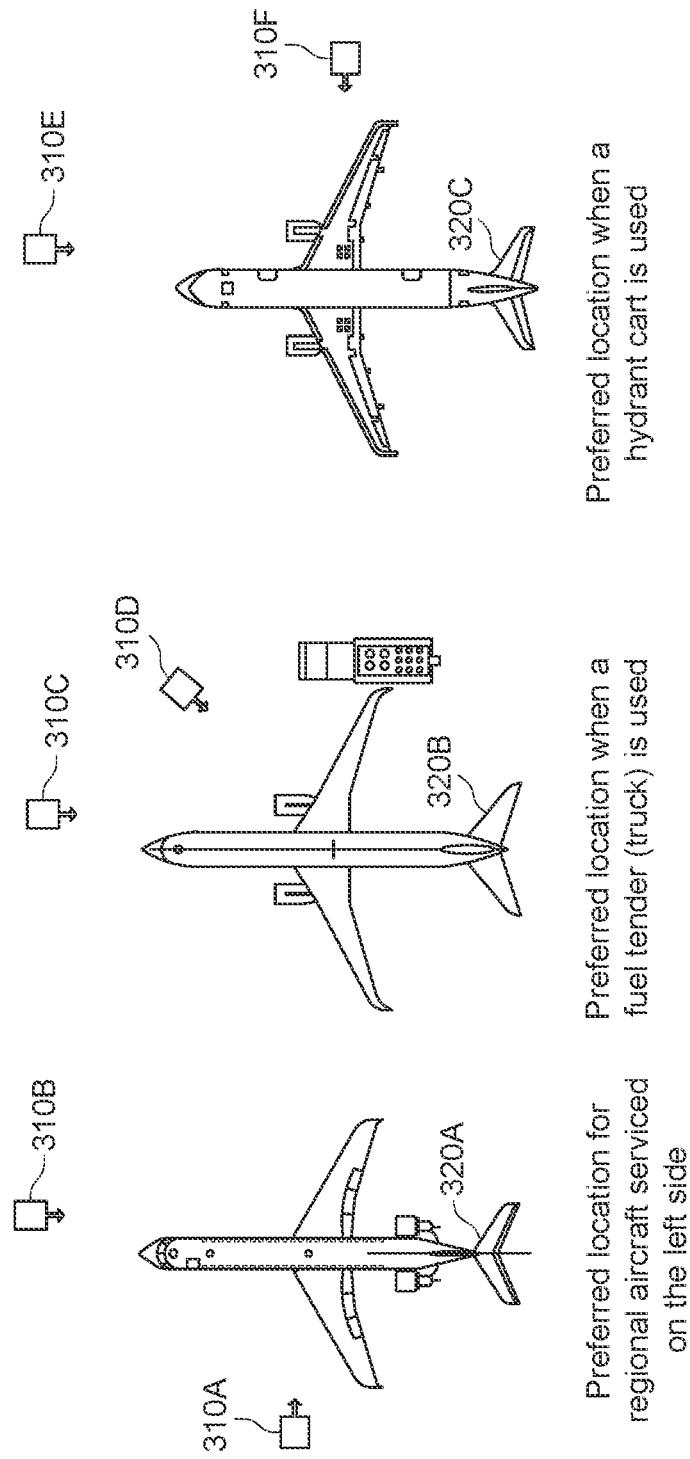
FIG. 2 illustrates camera placement around an operational safety zone (OSZ) or Safety Diamond, in accordance with some embodiment discussed herein.

In some examples, servicing of the aircraft may focus on the port or left side of the aircraft as illustrated on regional aircraft such as the CRJ700. Two or more video camera units 150 may be assigned to a single aircraft. Thus, video camera unit 150 may be positioned off the left wing outside the operational safety zone (OSZ) or Safety Diamond in the general vicinity as shown in the FIG. 2. Illustrative locations for a plurality of video camera units 310 (illustrated as video camera unit 310A, 310B, 310C, 310D, 310E, 310F) and particular aircrafts 320 (illustrated as aircraft 320A, 320B, 320C) are provided.

Figure 3:
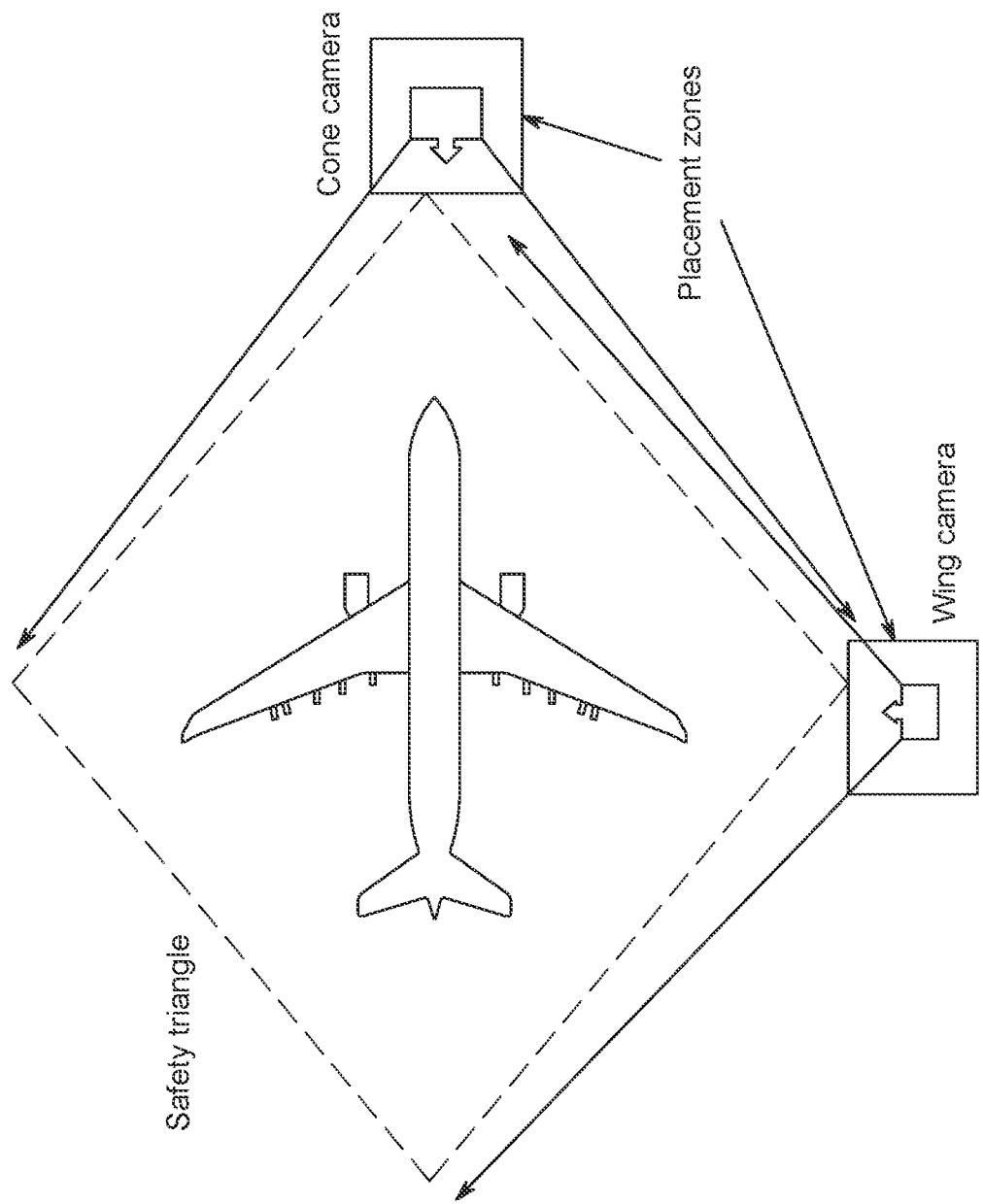
FIG. 3 illustrates camera placement around an operational safety zone (OSZ) or Safety Diamond, in accordance with some embodiment discussed herein.

In some instances, video camera unit 150 may be placed where it would have a vantage point covering the entire operational safety zone (OSZ) or Safety Diamond in order to see all of the operational activities that occur while servicing the aircraft, as illustrated in FIG. 3. For example, the camera placement may be on the opposite wing side if the observed aircrafts cargo compartments exist on the port side versus the starboard side.

The markings may be placed in other locations as well, including a ramp, front/back of an aircraft, security door, or other location may correspond with a rule from rules data store 122. In some examples, the rules (e.g., location of one or more video camera units 150) may correspond with an airplane type.

Arrows incorporated with each video camera unit 150 may facilitate proper orientation and alignment. For example, an arrow may be printed on top of the rugged casing. Generally, the arrows will be pointed towards the aircraft. The lenses are wide angle and capture a lot of area. Fuel tenders and catering trucks may block the entire view for an extended period of time depending on service requirements. Thus, be cognizant of the camera position when such ground equipment is used.

Illustrative Examples In Rules Data Store

Rules data store 122 may comprise a plurality of rules.

An illustrative rule may comprise a 3-stop brake check. The rule may assume the vehicle is clearly visible at all times. Image data may be compared with images corresponding with this rule to determine satisfaction of the rule. Satisfaction of the rule may confirm that (1) the vehicle has carried out three stops, (2) the approximate distance between stops, and (3) whether the distance falls under compliance parameters (around 50% distance between each stop, etc.).

An illustrative rule may comprise handrails on Ground Service Equipment (GSE) being used. The camera setup may be adjusted to determine satisfaction of this rule (e.g., the camera line of sight may confirm that the image data clearly distinguishes between person gripping the handrail and person simply moving their arm as they are walking beside the handrail, etc.). Satisfaction of the rule may confirm object detection (hand gripping handrail) and pose estimation (detecting person's skeletal and hand movements and trying to infer whether they are leaning on or gripping the handrail, detection based on 2 knees present, belt loader+ working area tracking, etc.).

An illustrative rule may comprise pre-arrival safety huddle conducted at huddle cone. Satisfaction of the rule may confirm detection of 3 or more persons stopping for 20-60 seconds near to a cone.

An illustrative rule may comprise a lead marshaller and wing marshallers/walkers in correct position. The camera setup may be adjusted to confirm media data is captured of marshallers, including lead marshaller, and wing marshallers positions. The camera setup may be adjusted to detect wing marshallers positions that correspond with the aircraft size. The camera setup may be adjusted to detect safety zone markings on the ground. The camera setup may be adjusted to determine aircraft pose estimation. In some examples, aircraft and workers coordinates may be connected with a digital map (e.g., 2-dimensional) or geolocation device.

An illustrative rule may comprise detection of employees wearing safety vests secured to their body. Satisfaction of the rule may confirm the vest is "Secured to body" (e.g., zipped, over two shoulders, across the back and front of the body, etc.) or detection of an unsecured vest (e.g., unzipped or unbuttoned vests, etc.).

An illustrative rule may comprise cones placed in proper positions and timely. The camera setup may be adjusted to detect cones between the camera and the aircraft, including cones behind aircraft. Satisfaction of the rule may confirm that (1) detect all cones visible in the scene and (2) demonstrate the approach allowing to detect wing cones, tail cone, and front wheel cone being in position.

An illustrative rule may comprise a detection of a belt loader as an object and/or detect stops they are making. The rule may detect that a belt loader is making a stop at a stop sign or other required stop location. The analysis may utilize a combination of ML and non-ML methods to detect belt loaders as objects and to detect the stops they are making. For example, real-time transaction engine 110 may determine where the loader is (e.g., geolocation, relative or adjacent objects, etc.) and transfer the coordinates into an array. The analysis may comprise smoothing the data with one of the filters (e.g., arithmetic mean, running average, Kalman filter), after which the averaged data for 5 passes is passed through a function that compares how much the coordinate has shifted compared to the last pass and after a small logical function that checks if the coordinate moved after the last check. This may confirm a new stop.

Machine Learning Pipeline

The system may incorporate one or more machine learning (ML) models. In some examples, the ML model may be pre-built and/or pre-configured platform with processing pipelines and infrastructures consisting of libraries (e.g., pre-configured TensorFlow, Yolo, PyTorch libraries), weights, models, and software code (e.g., C, C++, Python, Erlang and Node.js).

The models may vary from gate to gate, airport to airport, and may vary by aircraft type. In some examples, the models may vary by gate and airport based on where the video capture units will be placed. For the models to be trained to a high degree of precision, the ML models may consistent placement zones which will not be possible to be identical across every gate and airport.

Multiple machine learning models may be implemented. For example, a first ML model may identify an aircraft and a second ML model may identify the services required for the identified aircraft. For example, a first ML model may identify a model of aircraft that is entering the operational safety zone (OSZ) or Safety Diamond and a second ML model may apply the correct camera locations and/or markings for services.

The ML model may correspond with linear or non-linear function. For example, the ML model may comprise a supervised learning algorithm that accepts the one or more input features associated with video data (e.g., streaming file, etc.) to provide a score.

In some examples, when a nonlinear machine learning model is used, the weightings of fields corresponding with the video data may vary according to one or more object identifiers corresponding to the media data. This may be illustrated by a presence of an object (e.g., a vest, a safety cone, etc.) at a location corresponding with satisfying a safety rule for that location. In some examples, the weight may be decided through an iterative training process for each ML model.

In some examples, the ML model may comprise a Deep Learning Neural Network, consisting of more than one layer of processing elements between the input layer and the output later. The ML model may further be a Convolutional Neural Network, in which successive layers of processing elements contain particular hierarchical patterns of connections with the previous layer.

In some examples, the ML model may comprise an unsupervised learning method, such as k-nearest neighbors, to classify inputs based on observed similarities among the multivariate distribution densities of independent variables in a manner that may correlate with activity that does not correspond with the safety rules or regulations.

Prior to receiving the input features associated with the video data, the ML model may be trained using a training data set of historical video data or standardized segment data for a particular aircraft. For example, the training data set may comprise a plurality of images and locations of an airplane that identify compliance with a safety rule. The correlation of the image to the safety rule may help determine one or more weights assigned to each of these input features.

In some examples, the ML model may be incorporated with a service function call. For example, real-time transaction engine 110 may transmit input data to a third party that generates the trained ML model. The third-party may provide the input data to the trained ML model and transmit output back to real-time transaction engine 110. Real-time transaction engine 110 may incorporate the output as, for example, correlating media data with a prediction of compliance with a safety rule.

Figure 4:
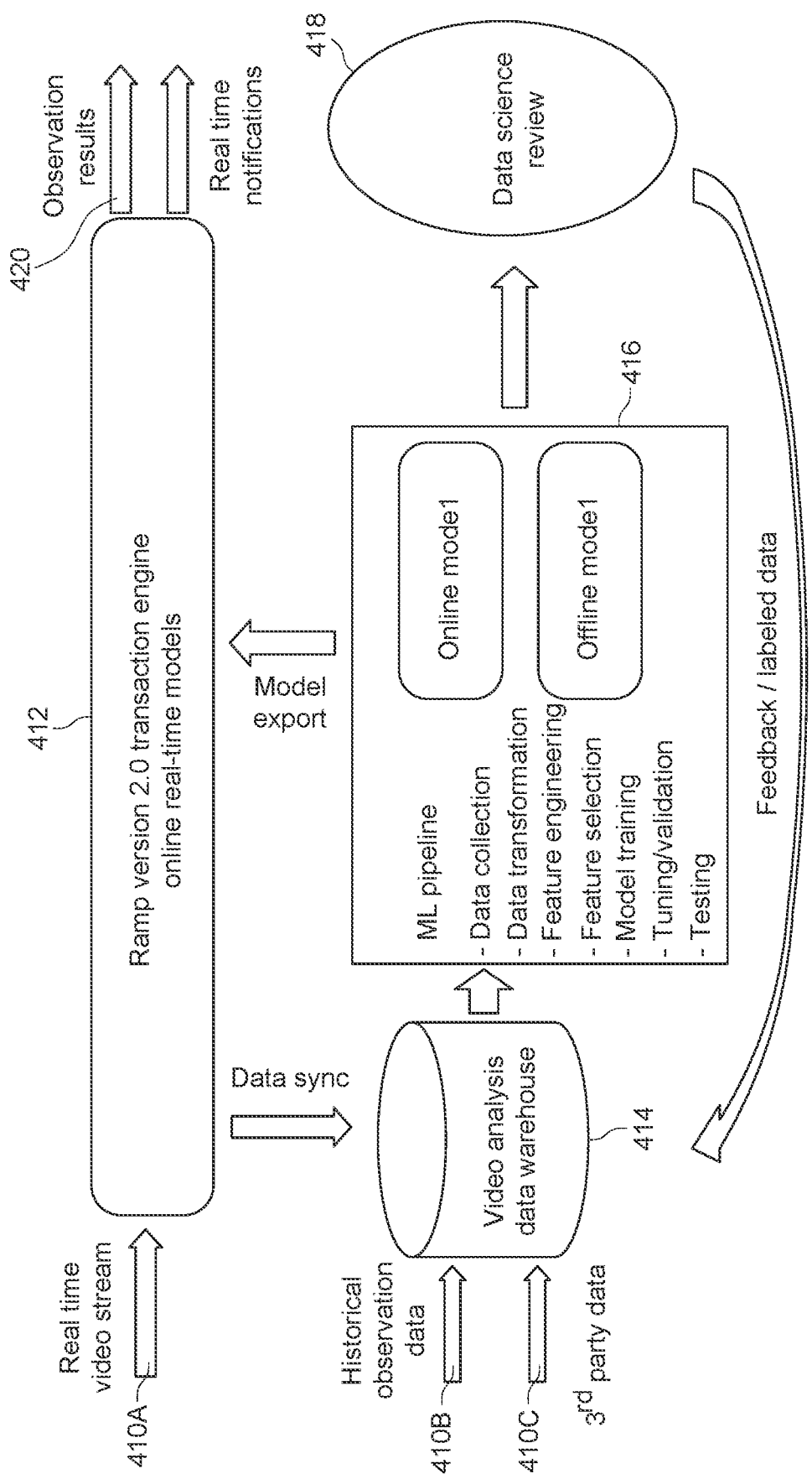
FIG. 4 is an illustrative machine learning (ML) model and data pipeline, in accordance with some embodiment discussed herein.

An illustrative ML model and data pipeline is provided with FIG. 4. In some examples, the ML model and data pipeline is executed by real-time transaction engine 110 illustrated in FIG. 1.

At block 410, input may be received. Input may be received from various sources, including real-time video stream data 410A, historical observation data 410B, or third-party data 410C.

At block 412, the input may be provided to real-time transaction engine. In some examples, the ML models may be previously trained ML models and the data may be provided to the ML models in real-time.

At block 414, the input may be stored in a data store. Data from the real-time transaction engine may be synchronized and/or stored with the data store.

At block 416, the data may be provided to the ML pipeline. The ML pipeline may comprise online or off-line models. The ML pipeline may comprise data collection, data transformation, feature engineering, feature selection, model training, tuning and validation, and testing.

At block 418, output from the ML pipeline may be provided to a data science review. The output may comprise ranking and/or scoring. As an illustrative example, the input may include a video stream of a walk around a plane with one or more safety issues identified in the video stream. The output may correlate the images found in the video stream with rules, predefined safety issues, or other data that is feedback for future machine learning models. The ML models can use the output from the data science review to identify additional safety issues in future videos.

At block 420, observation results, reporting, and/or real-time notifications may be provided. For example, the safety issues may be identified by the ML model and additional information may be included with each safety issue. The safety issues may be ranked and/or scored in order of importance and the like. The list of safety issues, observation results, reporting, and/or real-time notifications may be provided to a graphical user interface (GUI). An illustrative example is provided with FIGS. 5, 12, 15, 15A, and 15B.

Reporting Dashboard And Notifications

The reporting dashboard may be generated by reporting circuit 116 of real-time transaction engine 110 and provide analytics obtained from the analysis of video data uploaded from the plurality of video camera units 150. The dashboard may be used to present the information in the form of charts, graphs, and tables. This visual display enables the user to more easily identify areas of concern and negative trends.

Accessibility of the dashboard may correspond with different levels of authentication. For example, each user may be issued a unique username and password. The username may correspond with a particular level of access and user type, such that some reports may only be accessible to a particular user type. For example, client device 160 may transmit a username and profile via network 130. Authentication circuit 118 may compare the username with a stored user profile to identify a user type. Reports, data, and other information accessible by the particular user type may be displayed for presentation at user interface 162.

User types may correspond with an airport level, customer level, and an executive level. The airport level users may be provided access only to a particular stations dashboard and analytics. This level may be assigned to general managers, station managers, station safety managers, and the like. The customer level users may be provided access to only observations assigned to a specific customer. The executive level users may be provided access to dashboards and analytics for every location associated with an airport facility. This level may be assigned to corporate executive leaders and regional vice president (RVP).

A home screen may comprise access to welcome screens for each of the different user levels. The home screen may provide access to three dashboards, including executive dashboard, monitoring report, and monitoring details.

Illustrative reports are provided in FIGS. 5-15.

Figure 5:
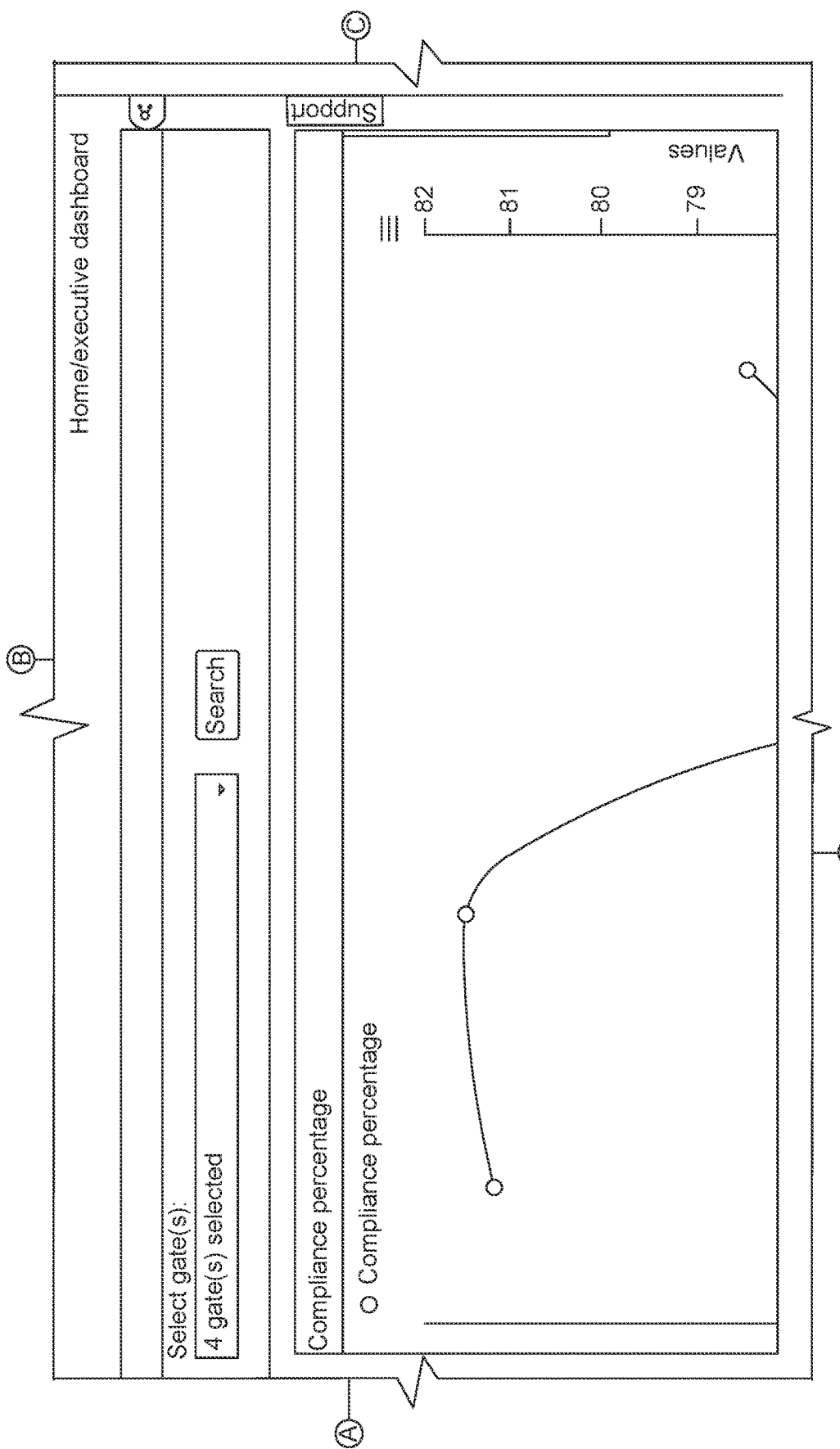
FIG. 5 illustrates a graphical user interface providing an executive dashboard, in accordance with some embodiment discussed herein.
Figure 5:
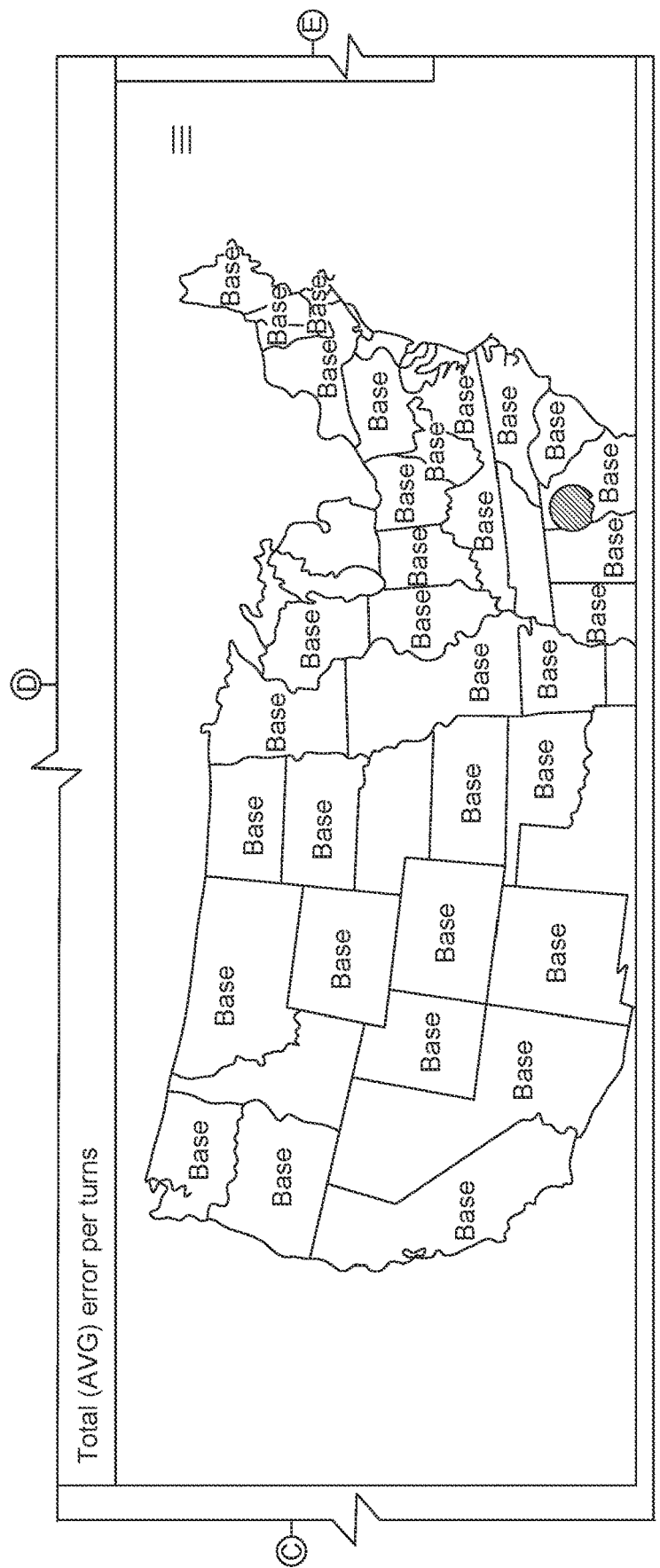
Figure 5:
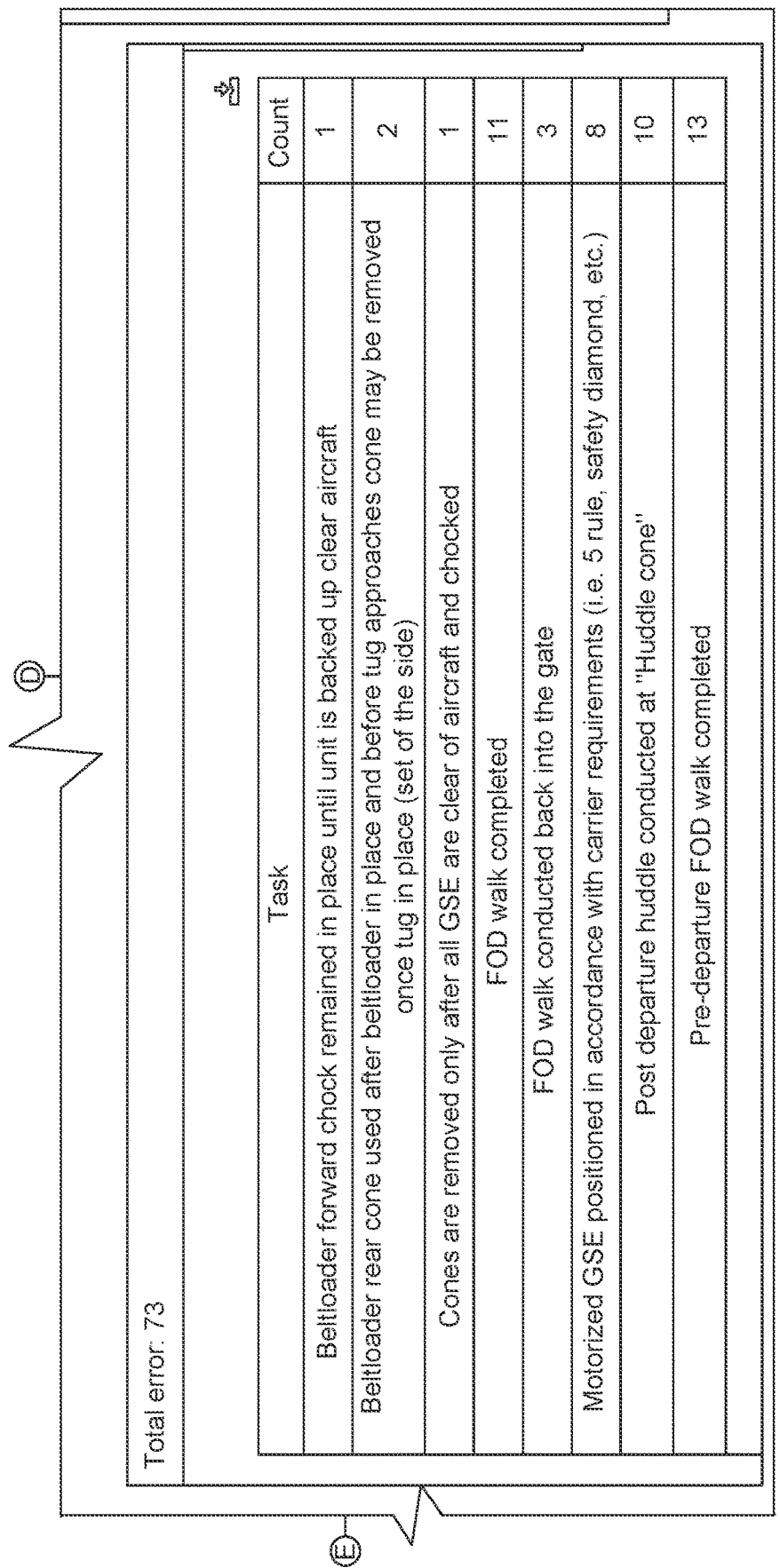

FIG. 5 illustrates a graphical user interface providing an executive dashboard, in accordance with some embodiment discussed herein. Executive dashboard may be accessible when an authenticated user corresponding with an executive level accesses the system.

In some examples, the executive dashboard may provide a search tool that can identify safety compliance averages between a time range and/or at a particular location (e.g., Airport A, etc.). The compliance averages may be sorted by stages (e.g., arrival, post-arrival, post-departure, pre-arrival, pre-departure preparations, upload, etc.).

In some examples, the executive dashboard may provide a compliance percentage in a graph, table, chart, geographical location map, or other graphical representation.

In some examples, the safety compliance issues that were included with the safety compliance averages. The issues may be limited in accordance with the time range and/or at a particular location in the executive dashboard. Each issue may correspond with a predetermined value (e.g., illustrated as "count"). The predetermined value may be higher for more critical safety issues and lower for less critical safety issues.

Figure 6:
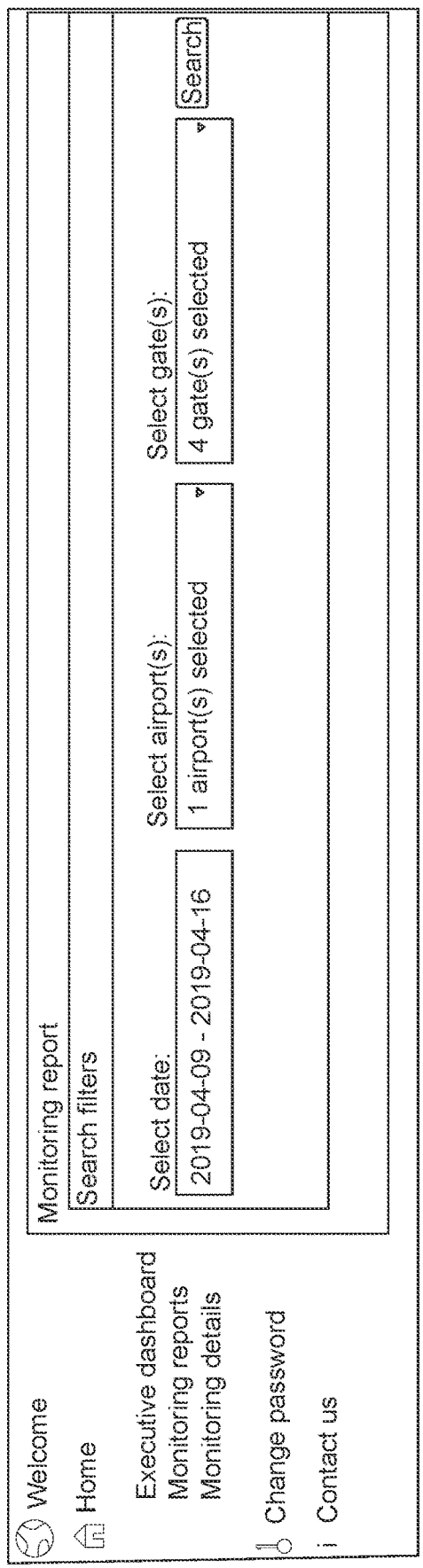
FIG. 6 illustrates a graphical user interface providing a monitoring report dashboard, in accordance with some embodiment discussed herein.

FIG. 6 illustrates a graphical user interface providing a monitoring report dashboard, in accordance with some embodiment discussed herein. In some examples, the executive dashboard may provide a search tool that can identify safety compliance averages between a time range, a particular location, and/or at one or more airport gates (e.g., Airport A, Terminal 2, Gates 100, 101, 102, and 103, etc.).

Figure 7:
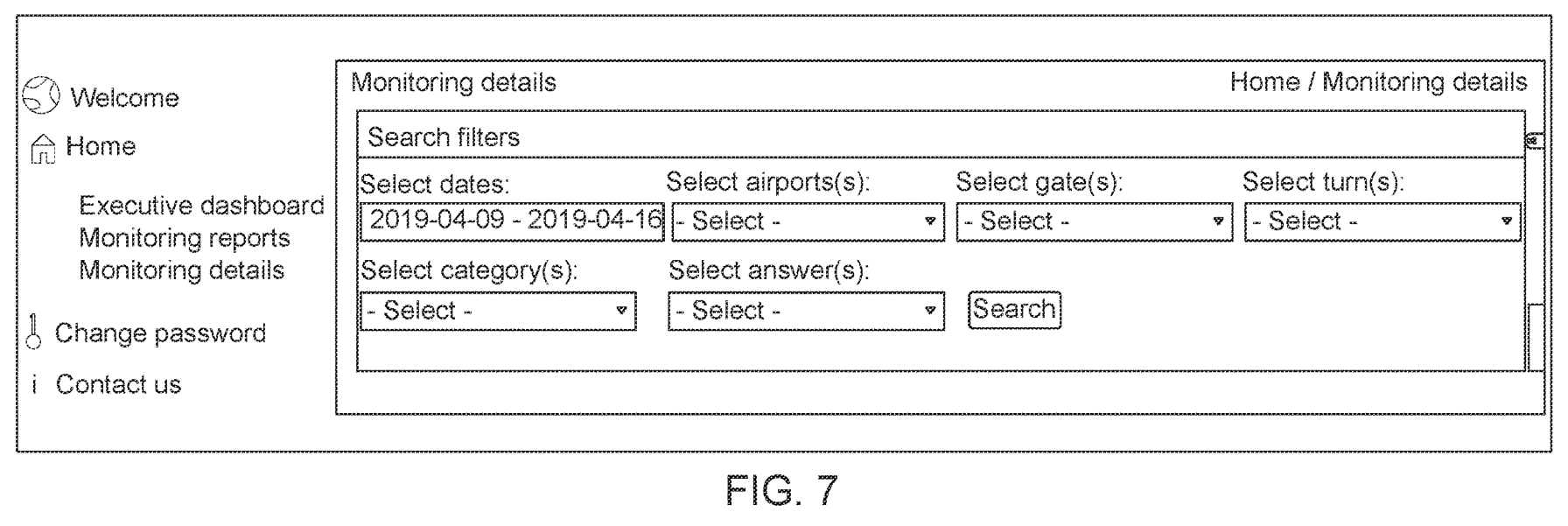

FIG. 7 illustrates a graphical user interface providing a monitoring details dashboard, in accordance with some embodiment discussed herein. In some examples, the executive dashboard may provide a search tool that can identify safety compliance averages between a time range, a particular location, one or more airport gates, and other filters available by the system, including turns, categories, answers, and the like.

FIG. 8 illustrates a graphical user interface for providing a search function within an executive dashboard, in accordance with some embodiment discussed herein. In some examples, access to this GUI is limited to the executive dashboard.

In this illustrative example, a select date tool, a selected airport tool, and a select gate tool are shown. The "Select Date" window allows for filtering the data via a selected date range (the default is the most recent 7-day period ending with the present day. The "Select Airports" window shows only the local airport for users with Airport Access Level. Executive Level users are able to choose any airport where real-time transaction engine 110 and/or video camera unit 150 is deployed. The "Select Gates" window allows for filtering the data relative to gate location.

FIG. 9 illustrates a graphical user interface for providing compliance averages, in accordance with some embodiment discussed herein. This panel may show the average compliance rate per "stage of operation" observed for the selected date range. Access to this GUI may not be limited to the executive level authentication as illustrated in FIG. 5.

Figure 10:
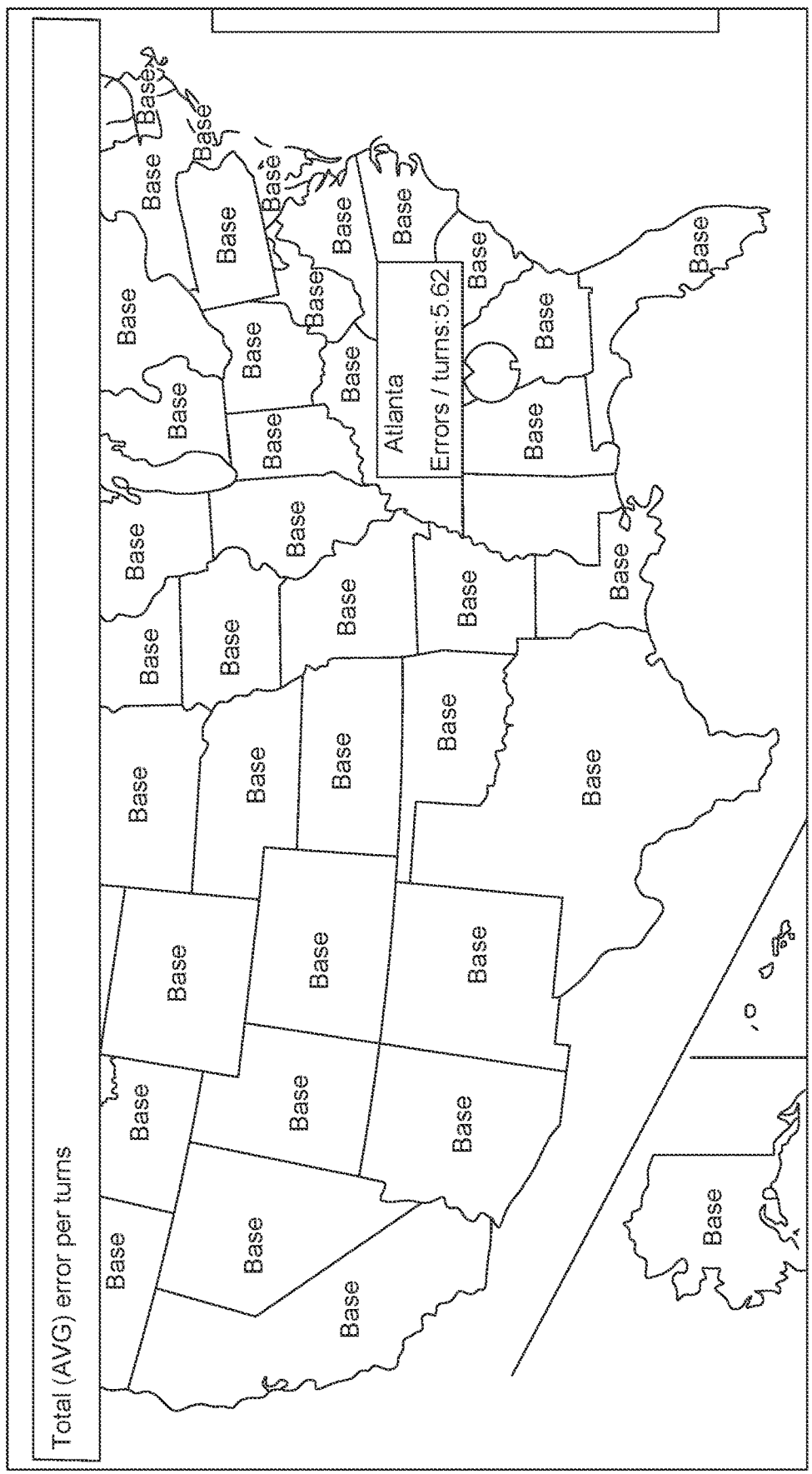
FIG. 10 illustrates a graphical user interface for providing a total average errors per turn panel, in accordance with some embodiment discussed herein.

FIG. 10 illustrates a graphical user interface for providing a total average errors per turn panel, in accordance with some embodiment discussed herein. For example, a user operating client device 160 may access this dashboard panel. The user may hover a mouse cursor over a dot representing a particular airport to display an average errors per turn. In some examples, access to this GUI may not be limited to the executive level authentication as illustrated in FIG. 5. Other methods of presenting the average errors per turn may be provided without diverting from the scope of the disclosure.

Figure 11:
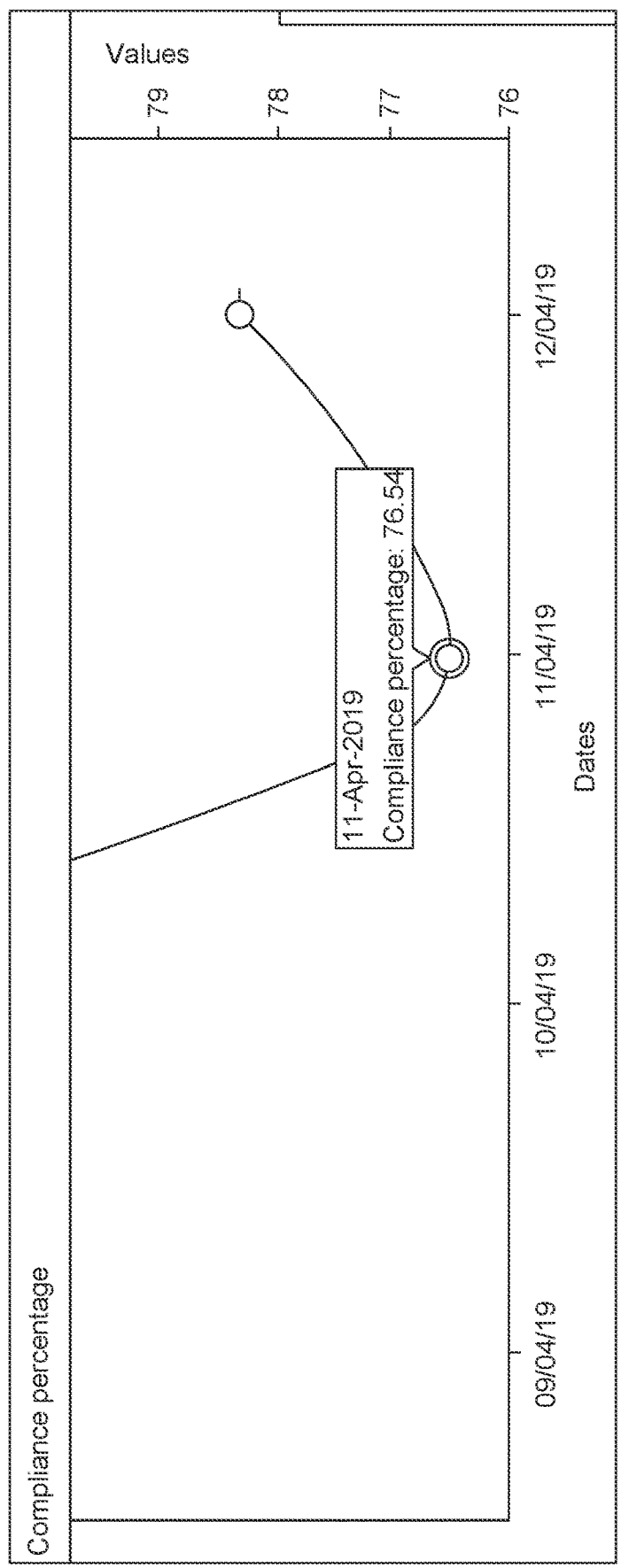
FIG. 11 illustrates a graphical user interface for providing a compliance percentage panel, in accordance with some embodiment discussed herein.

FIG. 11 illustrates a graphical user interface for providing a compliance percentage panel, in accordance with some embodiment discussed herein. This panel shows a graphical illustration of the compliance percentage each day in the selected range. For example, a user operating client device 160 may access this dashboard panel. The user may hover a mouse cursor over any data point to display the actual value. In some examples, access to this GUI may not be limited to the executive level authentication as illustrated in FIG. 5. Other methods of presenting the average errors per turn may be provided without diverting from the scope of the disclosure.

FIG. 12 illustrates a graphical user interface for providing a total error panel, in accordance with some embodiment discussed herein. This panel provides a total error count for each violation observed for the selected date range. In some examples, access to this GUI may not be limited to the executive level authentication as illustrated in FIG. 5.

Figure 15:
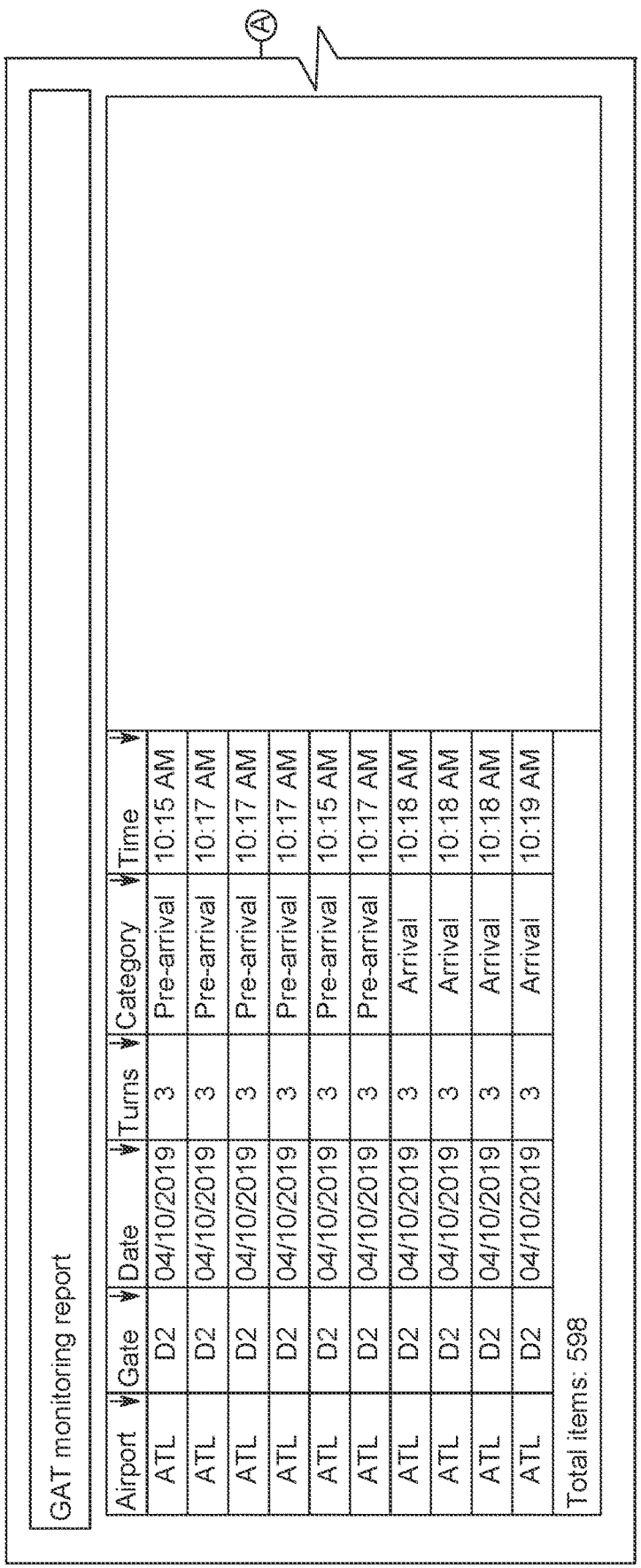
FIG. 15 illustrates a graphical user interface for providing a monitoring report, in accordance with some embodiment discussed herein.

FIGS. 13-15 may correspond with illustrative examples of monitoring reporting dashboard panels.

FIG. 13 illustrates a graphical user interface for providing a search filters panel, in accordance with some embodiment discussed herein. In this illustrative example, a select date tool, a selected airport tool, and a select gate tool are shown. The "Select Date" window allows for filtering the data via a selected date range (the default is the most recent 7-day period ending with the present day. The "Select Airports" window shows only the local airport for users with Airport Access Level. Executive Level users are able to choose any airport where real-time transaction engine 110 and/or video camera unit 150 is deployed. The "Select Gates" window allows for filtering the data relative to gate location.

FIG. 14 illustrates a graphical user interface for providing a monitoring details panel, in accordance with some embodiment discussed herein. The "Select Date" window allows for filtering the data via a selected date range (the default is the most recent 7-day period ending with the present day. The "Select Airports" window shows only the local airport for users with Airport Access Level. Executive Level users are able to choose any airport where real-time transaction engine 110 and/or video camera unit 150 is deployed. The "Select Gates" window allows for filtering the data relative to gate location. The "Select Turns" window allows for filtering based on which turn of the day; 1st, 2nd, 3rd, etc. The "Select Categories" window allows for filtering based on operational stages.

FIG. 15 illustrates a graphical user interface for providing a monitoring report, in accordance with some embodiment discussed herein. This report may be populated according to the filtering selections made in the Search Filters panel. In some examples, a checkmark appears in the Camera column when a photo is available by clicking on the icon in the Picture column.

FIG. 15A illustrates a graphical user interface for providing an observation improvement report, in accordance with some embodiment discussed herein. This report may compare an operating phase or individual observations compliance score to another to illustrate the differences between the two. The report may be limited to a selected date range. In some examples, the report may show the difference in improvement or non-improvement between a date range in the effort to drive observation and/or safety issue improvement.

Figure 15B:
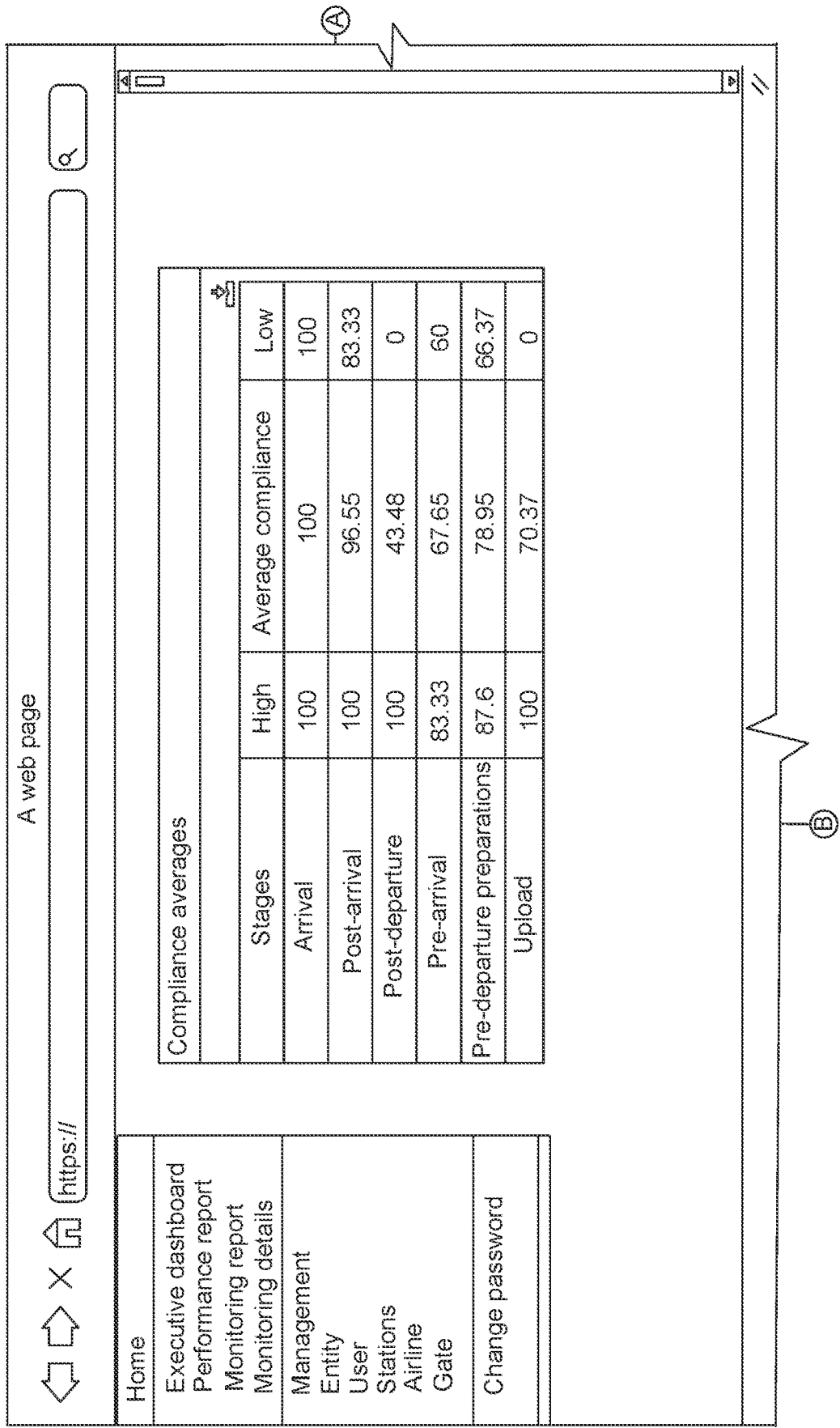
FIG. 15B illustrates a graphical user interface for providing a real-time alert dashboard, in accordance with some embodiment discussed herein.
Figure 15B:
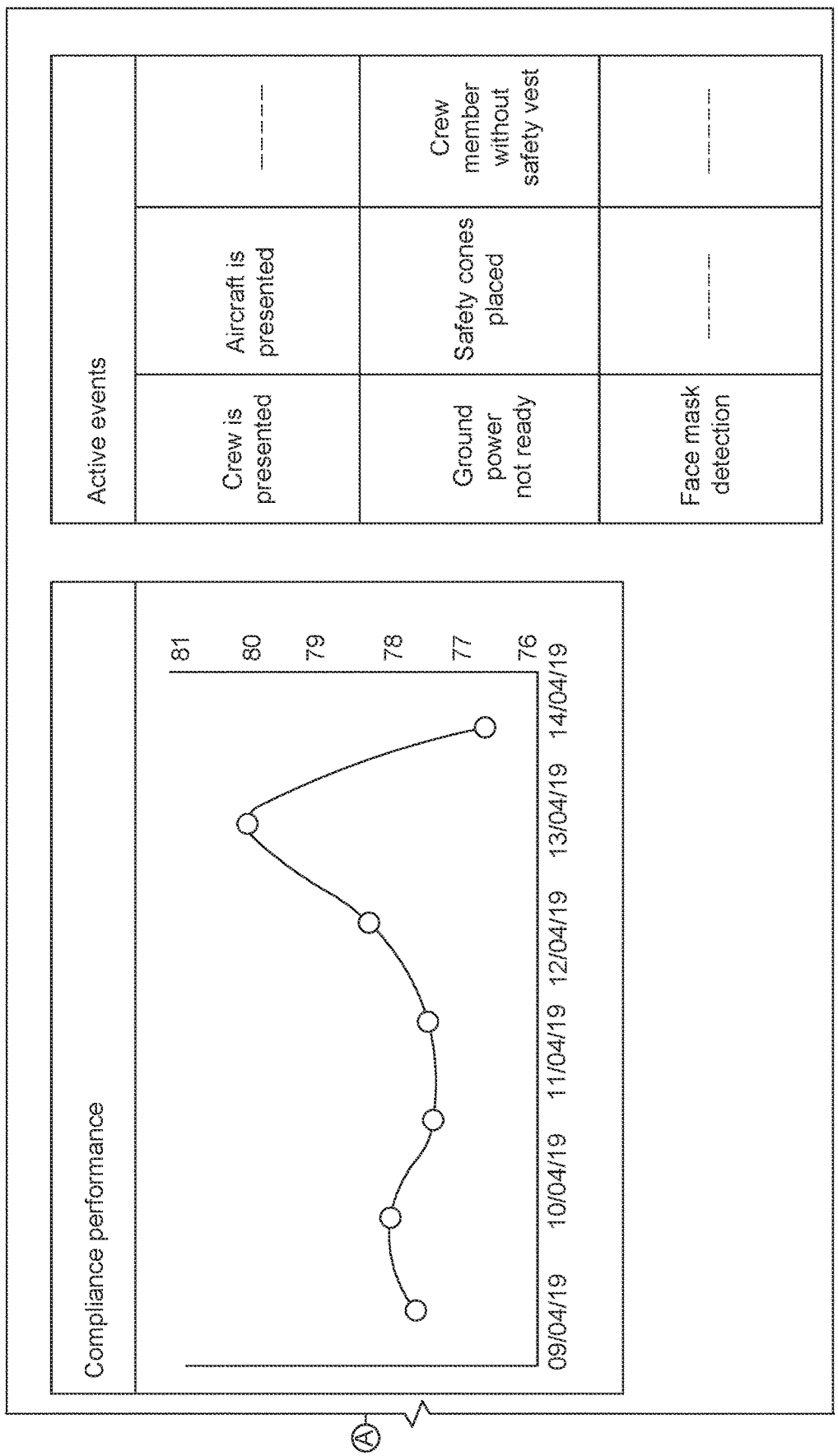
Figure 15B:
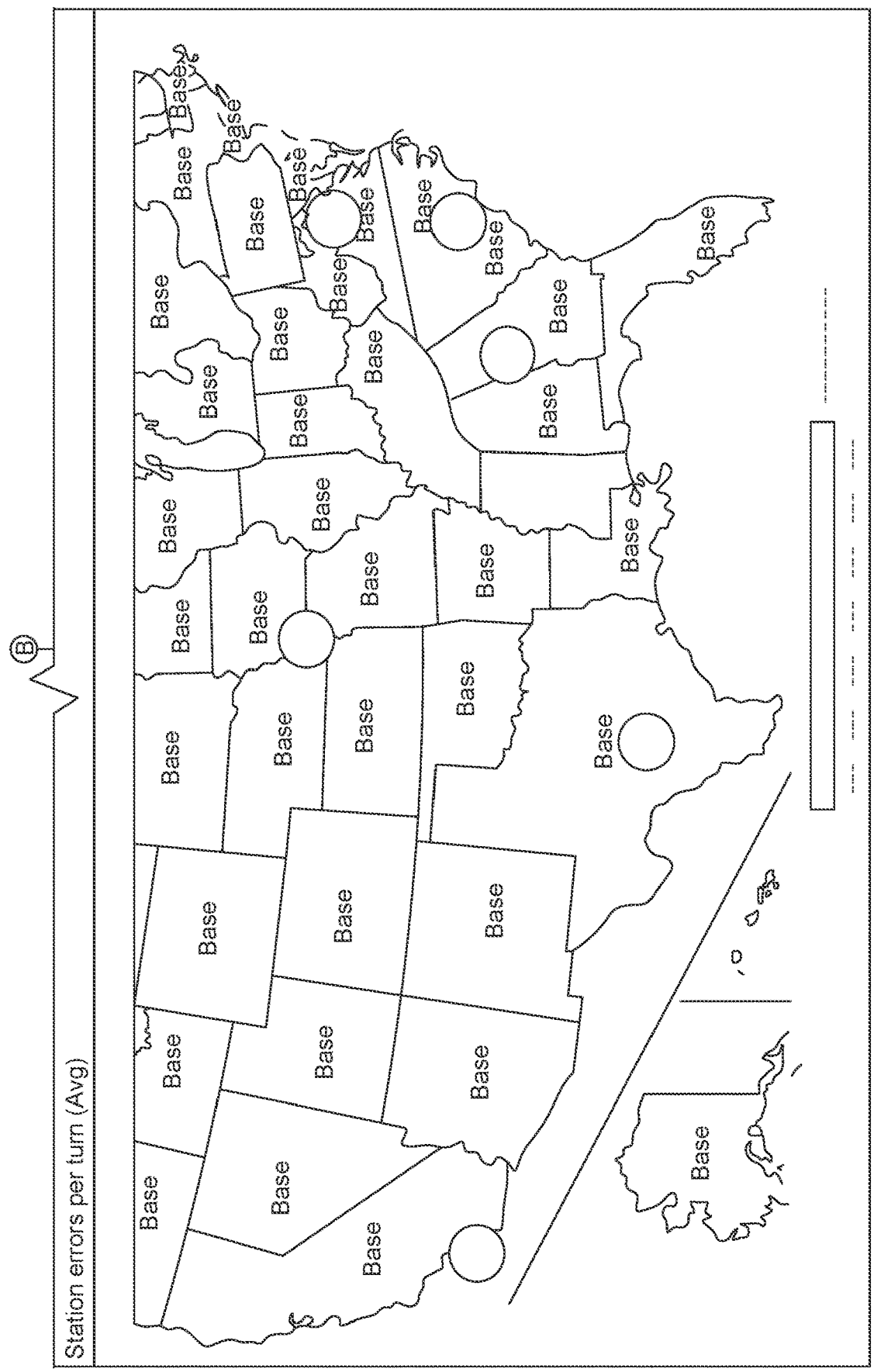
Figure 16:
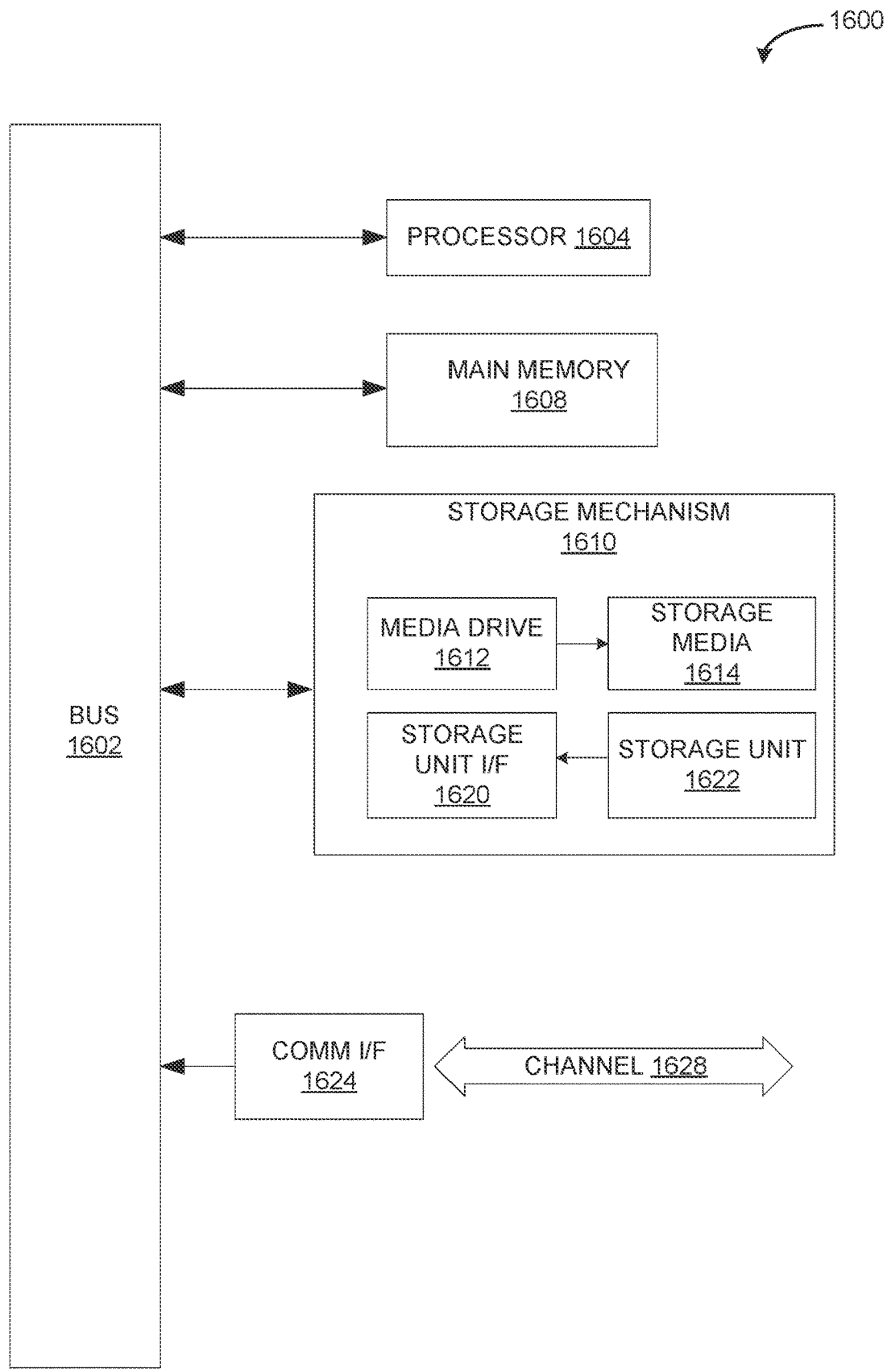
FIG. 16 is an example computing component that may be used to implement various features of embodiments described in the present disclosure.

FIG. 15B illustrates a graphical user interface for providing a real-time alert dashboard, in accordance with some embodiment discussed herein. This report may include a set of real-time alerts by phase to indicate where an observation is being observed. The report may include information in real-time or offline. The dashboard may provide functionality to allow a user to interact with the dashboard and drill down capabilities to determine (e.g., based on the level of authentication access) which airport, customer, and gate the safety issue and/or alert is originating from.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 16. Various embodiments are described in terms of this example logical circuit 1600. After reading this description, it will become apparent to a person skilled in the relevant art how to implement the technology using other logical circuits or architectures.

Referring now to FIG. 16, computing system 1600 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 1600 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1600 might include, for example, one or more processors, controllers, control engines, or other processing devices, such as a processor 1604. Processor 1604 might be implemented using a general-purpose or special-purpose processing engine such as, for example, a microprocessor, controller, or other control logic. In the illustrated example, processor 1604 is connected to a bus 1602, although any communication medium can be used to facilitate interaction with other components of logical circuit 1600 or to communicate externally.

Computing system 1600 might also include one or more memory engines, simply referred to herein as main memory 1608. For example, preferably random-access memory (RAM) or other dynamic memory, might be used for storing information and instructions to be executed by processor 1604. Main memory 1608 might also be used for storing temporary variables or other intermediate information during execution of instructions to be executed by processor 1604. Logical circuit 1600 might likewise include a read only memory ("ROM") or other static storage device coupled to bus 1602 for storing static information and instructions for processor 1604.

The computing system 1600 might also include one or more various forms of information storage mechanism 1610, which might include, for example, a media drive 1612 and a storage unit interface 1620. The media drive 1612 might include a drive or other mechanism to support fixed or removable storage media 1614. For example, a hard disk drive, a floppy disk drive, a magnetic tape drive, an optical disk drive, a CD or DVD drive (R or RW), or other removable or fixed media drive might be provided. Accordingly, storage media 1614 might include, for example, a hard disk, a floppy disk, magnetic tape, cartridge, optical disk, a CD or DVD, or other fixed or removable medium that is read by, written to, or accessed by media drive 1612. As these examples illustrate, the storage media 1614 can include a computer usable storage medium having stored therein computer software or data.

In alternative embodiments, information storage mechanism 1640 might include other similar instrumentalities for allowing computer programs or other instructions or data to be loaded into logical circuit 1600. Such instrumentalities might include, for example, a fixed or removable storage unit 1622 and an interface 1620. Examples of such storage units 1622 and interfaces 1620 can include a program cartridge and cartridge interface, a removable memory (for example, a flash memory or other removable memory engine) and memory slot, a PCMCIA slot and card, and other fixed or removable storage units 1622 and interfaces 1620 that allow software and data to be transferred from the storage unit 1622 to logical circuit 1600.

Logical circuit 1600 might also include a communications interface 1624. Communications interface 1624 might be used to allow software and data to be transferred between logical circuit 1600 and external devices. Examples of communications interface 1624 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1624 might typically be carried on signals, which can be electronic, electromagnetic (which includes optical) or other signals capable of being exchanged by a given communications interface 1624. These signals might be provided to communications interface 1624 via a channel 1628. This channel 1628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1608, storage unit 1620, media 1614, and channel 1628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1600 to perform features or functions of the disclosed technology as discussed herein.

Although FIG. 16 depicts a computer network, it is understood that the disclosure is not limited to operation with a computer network, but rather, the disclosure may be practiced in any suitable electronic device. Accordingly, the computer network depicted in FIG. 16 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A video analytics system for real-time monitoring and assessment of airplane ramp safety processes, the video analytics system comprising:
   a computer memory storing rules relating to the airplane ramp safety processes;
   at least two portable, video capture devices located at different predetermined positions with respect to an aircraft at an airport ramp, wherein the video capture devices include a wireless transmitter and are configured to:
   capture video and data related to positions and movements of objects relative to the aircraft at the airport ramp and positions and movements of individuals relative to the aircraft at the airport ramp; and
   transmit captured video footage and data via a wireless network to a server; and
   a server comprising a processor, programmed with computer instructions, which when executed cause the processor to operate a real-time transaction engine configured to:
   perform video analytics on the captured video and data to generate video analytics data;
   compare the video analytics data to the stored rules relating to the airplane ramp safety processes, including to determine any safety conditions;
   store results of the comparison in the computer memory; and
   output a real-time notification if the safety conditions are determined.

2. The video analytics system of claim 1, wherein the rules relating to the airplane ramp safety processes comprise a first set of rules for a first aircraft type and a second set of rules for a second aircraft type; and the predetermined positions of the video capture devices comprise a first set of positions for the first aircraft type and a second set of positions for the second aircraft type.

3. The video analytics system of claim 1, wherein the video capture devices are selectively positioned to provide a range of visibility to cover a safety diamond area of a parked aircraft.

4. The video analytics system of claim 1, wherein the stored rules comprise rules relating to a set of safety procedures including an identification of at least a subset of the following:
   i. proper uniforms are worn with safety vests that are identified as zipped up,
   ii. an appropriate placement of safety cones surrounding the aircraft, ground service equipment and other applicable area,
   iii. use of wheel chocks on the aircraft, ground service equipment and baggage carts,
   iv. an identification and verification of by-pass pins/switches are in place based on an aircraft type,
   v. an identification and verification of pre-flight and post-flight safety huddles,
   vi. verification that appropriate measures are deployed for any ground service equipment that approaches the aircraft, including the use of multiple identified brake checks and minimum distances from the aircraft,
   vii. verification that ground service equipment only operates within an allotted area of operation,
   viii. an identification and verification that foreign object debris walks are being conducted prior to the aircraft entering the airport ramp and prior to the aircraft leaving the airport ramp,
   ix. an identification and verification that wing walkers and marshals are in a pre-determined position prior to when the aircraft starts to approach airport ramp operation or starts its pushback out of the airport ramp operation, and
   x. an identification and verification that safety hand rails are being raised and used by ground service personnel as they walk on any ground service equipment to enter or exit the aircraft.

5. The video analytics system of claim 1, wherein the server comprises a web-based portal including a graphical user interface configured to present results of observations, analytical reports, alert notifications, and airport and gate configurations.

6. The video analytics system of claim 5, wherein the web-based portal is configured to display real-time alerts generated by a real-time alert management system.

7. The video analytics system of claim 1, comprising a real-time alert management system configured to notify a pre-configured set of resources if a safety condition is identified.

8. The video analytics system of claim 1, comprising a real-time alert management system configured to transmit notifications of the safety conditions via a mobile messaging communication protocol.

9. The video analytics system of claim 1, comprising a real-time alert management system configured to generate alert information if a safety condition is identified, including an airport and gate from which the alert information originated.

10. The video analytics system of claim 1, further comprising a set of machine learning models, wherein individual ones of the models are associated with the individual ones of the aircraft types, and wherein the server is configured to process the stored results of the comparison of the video analytics data generated from the video and data related to the positions and movements of objects relative to the aircraft at the airport ramp and the positions and movements of individuals relative to the aircraft to generate recommended improvements to the stored rules relating to the airplane ramp safety processes.

11. The video analytics system of claim 10, comprising a safety conditions verification module for designating the safety conditions as false positives or false negatives and providing feedback to the set of machine learning models to refine accuracy of the stored rules.

12. The video analytics system of claim 1, comprising a compliance score generation module configured to generate a compliance score corresponding to a number of rules that are satisfied based on the comparison of the video analytics data to the stored rules.

13. A computer-implemented method for real-time monitoring and assessment of airplane ramp safety processes, the computer-implemented method comprising:
   capturing video and data, by video capture devices, related to positions and movements of objects relative to an aircraft at an airport ramp and positions and movements of individuals relative to the aircraft at the airport ramp, wherein the video capture devices are located at different predetermined positions with respect to the aircraft at the airport ramp, and wherein the video capture devices include a wireless transmitter;
   transmitting captured video footage and data via a wireless network to a server;
   performing, by a server operating a real-time transaction engine, video analytics on the captured video footage and data to generate video analytics data;
   comparing the video analytics data to stored rules relating to the airplane ramp safety processes, including to determine any safety conditions;
   storing results of the comparison in a computer memory; and
   outputting a real-time notification if the safety conditions are determined.

14. The computer-implemented method of claim 13, wherein the rules relating to the airplane ramp safety processes comprise a first set of rules for a first aircraft type and a second set of rules for a second aircraft type; and the predetermined positions of the video capture devices comprise a first set of positions for the first aircraft type and a second set of positions for the second aircraft type.

15. The computer-implemented method of claim 13, wherein the video capture devices are selectively positioned to provide a range of visibility to cover a safety diamond area of a parked aircraft.

16. The computer-implemented method of claim 13, wherein the server further comprising a real-time alert management system configured to transmit notifications of the safety conditions via a mobile messaging communication protocol.

17. The computer-implemented method of claim 13, wherein the server further comprising a real-time alert management system configured to generate alert information if a safety condition is identified, including an airport and gate from which the alert information originated.

18. The computer-implemented method of claim 13, wherein the server further comprising a set of machine learning models, wherein individual ones of the models are associated with the individual ones of the aircraft types, wherein the server is configured to process the stored results of the comparison the video analytics data generated from the video and data related to the positions and movements of objects relative to the aircraft at the airport ramp and the positions and movements of individuals relative to the aircraft to generate recommended improvements to the stored rules relating to the airplane ramp safety processes.

19. The computer-implemented method of claim 18, wherein the server further comprising a safety conditions verification module for designating the safety conditions as false positives or false negatives and providing feedback to the set of machine learning models to refine accuracy of the stored rules.

20. The computer-implemented method of claim 13, wherein the server further comprising a compliance score generation module configured to generate a compliance score corresponding to a number of rules that are satisfied based on the comparison of the video analytics data to the stored rules.

* * * * *